(12) United States Patent
Schwarz et al.

(10) Patent No.: US 11,405,643 B2
(45) Date of Patent: *Aug. 2, 2022

(54) SEQUENTIAL ENCODING AND DECODING OF VOLUMETRIC VIDEO

(71) Applicant: Nokia Technologies Oy, Espoo (FI)

(72) Inventors: Sebastian Schwarz, Unterhaching (DE); Miska Hannuksela, Tampere (FI); Alireza Aminlou, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 16/637,428

(22) PCT Filed: Aug. 13, 2018

(86) PCT No.: PCT/FI2018/050581
§ 371 (c)(1),
(2) Date: Feb. 7, 2020

(87) PCT Pub. No.: WO2019/034807
PCT Pub. Date: Feb. 21, 2019

(65) Prior Publication Data
US 2020/0228836 A1 Jul. 16, 2020

(30) Foreign Application Priority Data
Aug. 15, 2017 (FI) ...................................... 20175731

(51) Int. Cl.
*H04N 19/597* (2014.01)
*G06T 15/04* (2011.01)
(Continued)

(52) U.S. Cl.
CPC ........... *H04N 19/597* (2014.11); *G06T 15/04* (2013.01); *G06T 17/10* (2013.01); *H04N 13/161* (2018.05)

(58) Field of Classification Search
USPC ................. 386/239-248, 226-342, 353-357
See application file for complete search history.

(56) References Cited

U.S. PATENT DOCUMENTS 5,764,237 A * 6/1998 Kaneko .................. G06T 15/04
345/552
5,850,352 A 12/1998 Moezzi et al.
(Continued)

FOREIGN PATENT DOCUMENTS

WO 2015/172227 A1 11/2015
WO 2016/003340 A1 1/2016
(Continued)

OTHER PUBLICATIONS

Mekuria et al., "Design, Implementation and Evaluation of a Point Cloud Codec for Tele-Immersive Video", IEEE Transactions on Circuits and Systems for Video Technology, vol. 27, No. 4, Apr. 2017, pp. 828-842.
(Continued)

*Primary Examiner* — Hung Q Dang
(74) *Attorney, Agent, or Firm* — Harrington & Smith

(57) ABSTRACT

The invention relates to methods, apparatuses, systems and computer program products for coding volumetric video. A first texture picture coded, said first texture picture comprising a first projection of first volumetric texture data of a first source volume of a scene model and a second projection of second volumetric texture data of said first source volume of said scene model, said first projection being from said first source volume to a first projection surface, and said second projection being from said first source volume to a second projection surface, said second volumetric texture data having been obtained by removing at least a part of said first volumetric texture data that has been successfully projected in said first projection. A a first geometry picture is coded, said geometry picture representing a mapping of said first
(Continued)

projection surface to said first source volume and a mapping of said second projection surface to said first source volume. Projection geometry information of said first and second projections is coded, said projection geometry information comprising information of position of said first and second projection surfaces in said scene model.

20 Claims, 11 Drawing Sheets

(51) Int. Cl.
  *G06T 17/10* (2006.01)
  *H04N 13/161* (2018.01)
  *G06T 9/00* (2006.01)
  *H04N 13/117* (2018.01)
  *H04N 13/344* (2018.01)
  *H04N 13/371* (2018.01)

(56) References Cited

U.S. PATENT DOCUMENTS

| | | | |
|---|---|---|---|
| 5,920,320 | A | 7/1999 | Shimizu |
| 6,525,731 | B1* | 2/2003 | Suits ............... G06T 15/04 345/421 |
| 7,430,312 | B2 | 9/2008 | Gu |
| 7,483,590 | B2 | 1/2009 | Nielsen et al. |
| 9,177,220 | B2 | 11/2015 | Givon |
| 9,256,980 | B2 | 2/2016 | Kirk |
| 9,317,970 | B2 | 4/2016 | Beeler et al. |
| 2013/0033586 | A1 | 2/2013 | Hulyalkar |
| 2013/0101017 | A1 | 4/2013 | De Vleeschauwer et al. |
| 2013/0321396 | A1 | 12/2013 | Kirk et al. |
| 2013/0321564 | A1 | 12/2013 | Smith et al. |
| 2014/0063024 | A1 | 3/2014 | Zhang et al. |
| 2014/0184596 | A1 | 7/2014 | Unger |
| 2015/0201176 | A1 | 7/2015 | Graziosi et al. |
| 2015/0208052 | A1 | 7/2015 | Kobiki |
| 2015/0228106 | A1* | 8/2015 | Laksono ............... G06T 15/04 345/419 |
| 2016/0065930 | A1 | 3/2016 | Chandra et al. |
| 2016/0112704 | A1 | 4/2016 | Grange et al. |
| 2016/0112713 | A1 | 4/2016 | Russell |
| 2017/0094262 | A1 | 3/2017 | Peterson et al. |
| 2017/0228940 | A1 | 8/2017 | Kutliroff |
| 2017/0310945 | A1* | 10/2017 | Juang ............... H04N 13/189 |
| 2020/0026166 | A1 | 1/2020 | Karasawa |
| 2020/0029092 | A1 | 1/2020 | Rath |

FOREIGN PATENT DOCUMENTS

| | | |
|---|---|---|
| WO | 2018/109265 A1 | 6/2018 |
| WO | 2018/172614 A1 | 9/2018 |
| WO | 2019/034808 A1 | 2/2019 |

OTHER PUBLICATIONS

"Call for Proposals for Point Cloud Compression V2", ISO/IEC JTC1/SC29/WG11 MPEG2017/N16763, Apr. 2017, 21 pages.

Berger et al., "State of the Art in Surface Reconstruction from Point Clouds", The Eurographics, State of The Art Report, 2014, 25 pages.

Sahay et al., "Geometric Inpainting of 3D Structures", Conference on Computer Vision and Pattern Recognition Workshops (CVPRW), Jun. 7-12, 2015, pp. 1-7.

"Parameter Values for Ultra-high Definition Television Systems for Production and International Programme Exchange", Recommendation ITU-R BT.2020, Oct. 2015, 8 pages.

"Parameter Values for the HDTV Standards for Production and International Programme Exchange", Recommendation ITU-R BT.709-6, Jun. 2015, 19 pages.

Office action received for corresponding Finnish Patent Application No. 20175731, dated Apr. 13, 2018, 8 pages.

International Search Report and Written Opinion received for corresponding Patent Cooperation Treaty Application No. PCT/FI2018/050581, dated Dec. 14, 2018, 17 pages.

Schwarz et al., "Nokia's response to CfP for Point Cloud Compression (Category 2)", Nokia Technologies, ISO/IEC JTC1/SC29/WG11 MPEG2017/M41779, Oct. 2017, 22 pages.

"Google/Draco", GitHub, Retrieved on Dec. 19, 2019, Webpage available at: https://github.com/google/draco.

Mamou et al. "FAMC: The MPEG-4 Standard for Animated Mesh Compression", 15th IEEE International Conference on Image Processing, Oct. 12-15, 2008, pp. 2676-2679.

Peng et al., "Acquiring Human Skeleton Proportions from Monocular Images without Posture Estimation", 10th International Conference on Control, Automation, Robotics and Vision, Dec. 17-20, 2008, pp. 2250-2255.

Urunuela et al., "2D Silhouette and 3D Skeletal Models for Human Detection and Tracking", Proceedings of the 17th International Conference on Pattern Recognition, Aug. 26, 2004, 4 pages.

Kim et al., "Compression Efficiency Evaluation for Virtual Reality Videos by Projection Scheme" IEIETransactions on Smart Processing and Computing, vol. 6, No. 2, Apr. 2017, pp. 102-108.

Karpinsky et al., "3D Video Compression with the H.264 Codec", Three-Dimensional Image Processing (3DIP) and Applications II, Proc. of SPIE-IS&T Electronic Imaging, vol. 8290, Jan. 2012, pp. 1-8.

"Information Technology—Dynamic Adaptive Streaming Over HTTP (DASH)—Part 1: Media Presentation Description and Segment Formats", ISO/IEC 23009-1, May 15, 2014, 152 pages.

Wang et al., "Accurate Full Body Scanning from a Single Fixed 3D Camera", Second International Conference on 3D Imaging,Modeling, Processing, Visualization & Transmission, Oct. 13-15, 2012, pp. 432-439.

Buglio et al., "Revealing Shape Semantics from Morphological Similarities of a Collection of Architectural Elements: The Case Study of The Columns of Saint-Michel De Cuxa", Digital Heritage International Congress (Digital-Heritage), Oct. 28-Nov. 1, 2013, pp. 465-472.

* cited by examiner

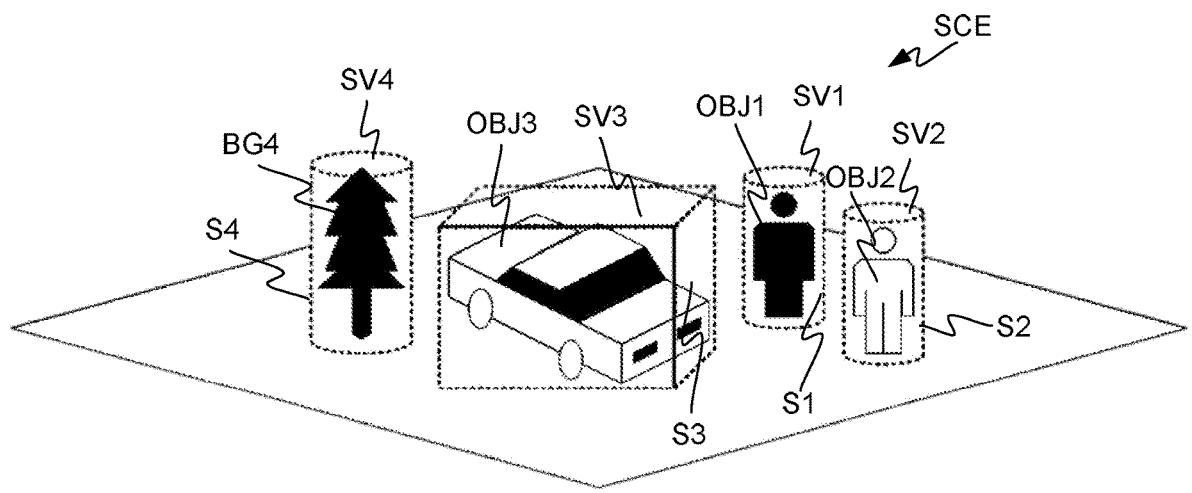
Fig. 5a
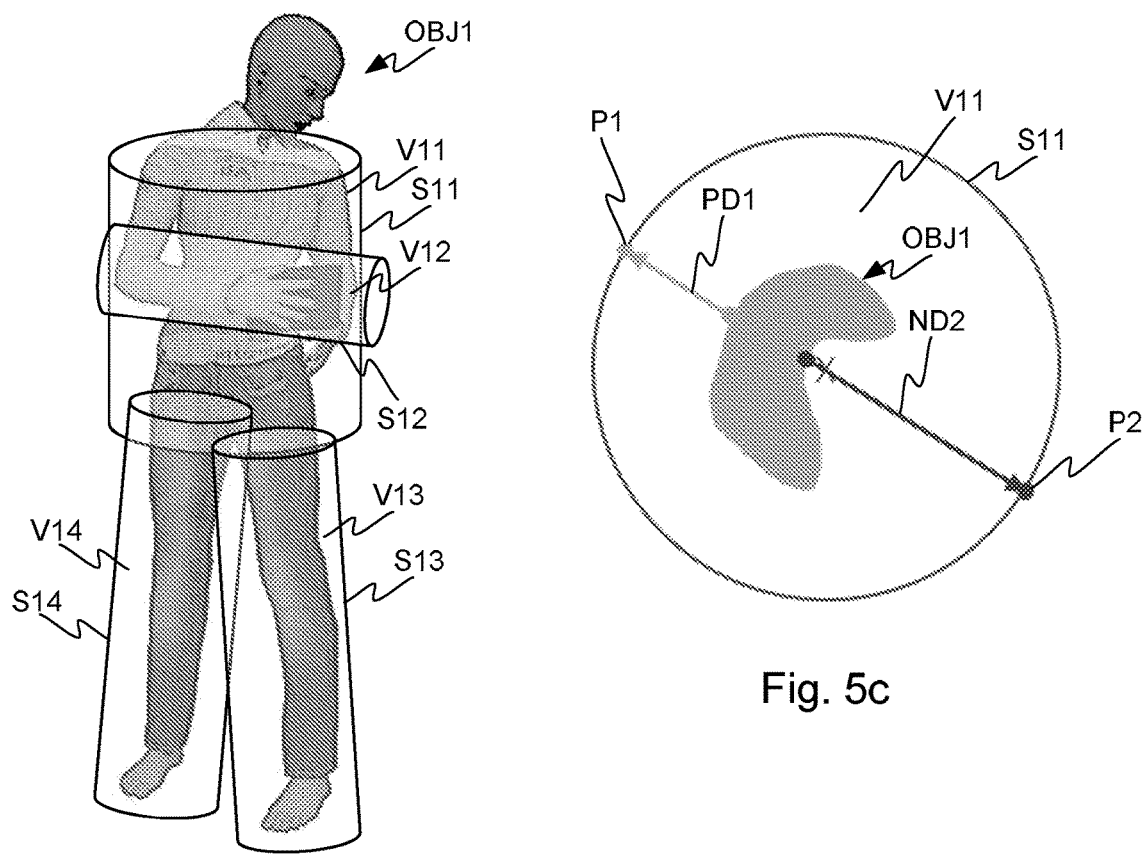
Fig. 5b
Fig. 5c

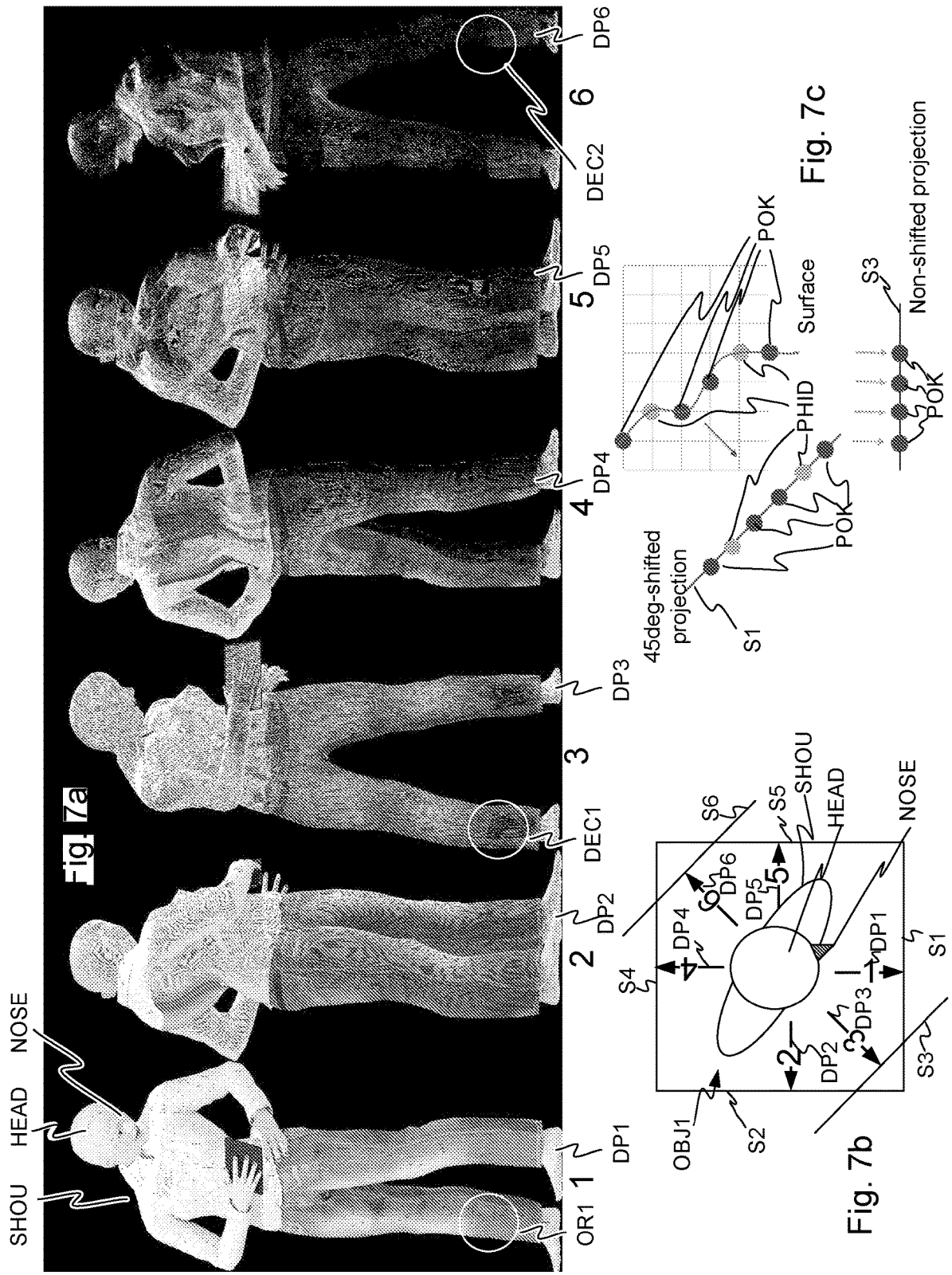

SEQUENTIAL ENCODING AND DECODING OF VOLUMETRIC VIDEO

RELATED APPLICATION

This application was originally filed as PCT Application No. PCT/FI2018/050581, filed on Aug. 13, 2018, which claims priority from FI Application No. 20175731, filed on Aug. 15, 2017.

BACKGROUND

Volumetric video data represents a three-dimensional scene or object and can be used as input for virtual reality (VR), augmented reality (AR) and mixed reality (MR) applications. Such data describes the geometry, e.g. shape, size, position in 3D-space, and respective attributes, e.g. color, opacity, reflectance and any possible temporal changes of the geometry and attributes at given time instances, comparable to frames in 2D video. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. Temporal information about the scene can be included in the form of individual capture instances, i.e. "frames" in 2D video, or other means, e.g. position of an object as a function of time.

The above mentioned volumetric video representation formats suffer from poor spatial and temporal coding performance.

There is, therefore, a need for solutions for improved coding of volumetric video.

SUMMARY

Now there has been invented an improved method and technical equipment implementing the method, by which the above problems are alleviated. Various aspects of the invention include a method, an apparatus (an encoder and a decoder), a system and a computer readable medium comprising a computer program stored therein, which are characterized by what is stated in the independent claims. Various details of the invention are disclosed in the dependent claims and in the corresponding images and description.

A volumetric video, for example dynamic point clouds, arrays of voxels or mesh models or a combination of such, may be projected onto a number of projection surfaces having simple geometries, for example sphere(s), cylinder(s), cube(s), polyhedron(s) and/or plane(s). In this context, a projection surface may be a piece-wise continuous and smooth surface in three-dimensional space. Piece-wise smoothness may be understood so that there are regions of the surface where the direction of the surface normal does not change abruptly (i.e. the values of the coefficients of the surface normal's coordinate components are continuous). A projection surface may comprise pieces of simple geometric surfaces. A projection surface may also evolve (change) over time. On such surfaces, the texture and geometry of point clouds, voxel arrays or mesh models may form pixel images, e.g. texture images and depth images (indicative of distance from the projection plane). Such projection surfaces may be unfolded onto two-dimensional (2D) planes, e.g. resulting in a two-dimensional pixel image. Standard 2D video coding may be applied for each projection to code the pixel information resulting from the texture data. In connection with the texture information, relevant projection geometry information, i.e. comprising e.g. projection or projection surface type, location and orientation of the projection surface in 3D space and/or size of the projection surface, may be transmitted either in the same bitstream or separately along the bitstream. At the receiver side, the bitstream may be decoded and volumetric video may be reconstructed from decoded 2D projections and projection geometry information.

In an encoding method, a bitstream may be encoded or encapsulated, the bitstream comprising one or more coded texture pictures and one or more coded accompanying additional pictures per texture picture. Each texture picture may represent a 2D projection of 3D data onto a given geometry. Several projections may be frame-packed into a single picture. An additional geometry picture may represent geometry data, e.g. depth. Additional auxiliary pictures may represent further attributes, e.g. surface normal, reflectance and opacity, transmittance and/or refraction of the 3D data. Relevant projection information may be indicated in or along the bitstream. For example, general projection information may be given in or along the bitstream: number of coded texture pictures or frame-packing information. Projection geometry information may be given for the projections: for example comprising shape, size, location and orientation of the projection surfaces. Temporal changes in location, orientation and size of such geometries may be encoded, possibly as function of time. Possible further sub-division of such geometries and resulting changes in geometry information may be given. Nature of auxiliary geometry data may be given: bit depth, quantisation, value range and/or inverse values, that is, coding of negative radius or depth values of the geometry picture. Nature of other auxiliary data, i.e. surface normal, reflectance and opacity, transmittance and/or refraction, etc. may be given.

In a decoding method, a bitstream comprising one or more coded texture picture(s) and one or more coded accompanying geometry pictures and auxiliary pictures per texture picture may be received and decoded. The texture picture represents a two-dimensional projection of three-dimensional data onto a projection surface with a given geometry. A geometry picture may represent geometry data, e.g. depth from the projection surface. Additional auxiliary pictures may represent further attributes, e.g. surface normal, reflectance, opacity, etc. as described earlier. Relevant projection information may also be decoded from or along a bitstream. From this decoded information a 3D scene model may be reconstructed accordingly.

A 3D object, represented as point cloud, may be sequentially projected onto a projection surface, i.e. the 3D projection is performed from different directions of the 3D object, one after another. In the case of occlusions of a certain primitive (point) when two points in 3D space are mapped on the same pixel of the projection surface, only the outmost points of the object surface are projected onto the projection surface. Successfully projected primitives (points) are then removed from the 3D object and the process is repeated for the next direction of projection. Step-by-step, the number of remaining points per projection will decrease, thus occlusions and mapping errors will be reduced. The process can be repeated until all sides of a geometry are covered, or a sufficiently large number of points has been projected (number of projection steps can be smaller, equal or larger than sides or natural directions of the projection surface).

As the numbers of projected points decrease, the projected 2D planes become more and more sparse. The coding efficiency of such sparse content may be increased by inpainting techniques to reduce sparsity. To avoid inpainted pixels creating new points in the reconstructed 3D object, masking or prediction-based determination of inpainted points at the decoder may be used.

According to a first aspect, there is provided a method, comprising: encoding a first texture picture into a bitstream, said first texture picture comprising a first projection of first volumetric texture data of a first source volume of a scene model and a second projection of second volumetric texture data of said first source volume of said scene model, said first projection being from said first source volume to a first projection surface, and said second projection being from said first source volume to a second projection surface, said second volumetric texture data having been obtained by removing at least a part of said first volumetric texture data that has been successfully projected in said first projection, encoding a first geometry picture into said bitstream, said geometry picture representing a mapping of said first projection surface to said first source volume and a mapping of said second projection surface to said first source volume, and encoding projection geometry information of said first and second projections into said bitstream, said projection geometry information comprising information of position of said first and second projection surfaces in said scene model.

According to a second aspect, there is provided a method, comprising: decoding a first texture picture from a bitstream to obtain first and second decoded texture data of a source volume, said first texture picture comprising a first projection of first volumetric texture data of a first source volume of a scene model and a second projection of second volumetric texture data of said first source volume of said scene model, said first projection being from said first source volume to a first projection surface, and said second projection being from said first source volume to a second projection surface, said second volumetric texture data having been obtained by removing at least a part of said first volumetric texture data that has been successfully projected in said first projection, decoding a first geometry picture from said bitstream to obtain first and second decoded geometry data of a source volume, said geometry picture representing a mapping of said first projection surface to said first source volume and a mapping of said second projection surface to said first source volume, decoding projection geometry information of said first and second projections from said bitstream, said projection geometry information comprising information of position of said first and second projection surfaces in said scene model, and forming a reconstructed scene model by projecting said first decoded texture data to a first destination volume using said first decoded geometry data and said first projection geometry information and by projecting said second decoded texture data to said first destination volume using said second decoded geometry data and said projection geometry information.

According to a third aspect, there is provided an apparatus comprising at least one processor, memory including computer program code, the memory and the computer program code configured to, with the at least one processor, cause the apparatus to perform at least the following: encode a first texture picture into a bitstream, said first texture picture comprising a first projection of first volumetric texture data of a first source volume of a scene model and a second projection of second volumetric texture data of said first source volume of said scene model, said first projection being from said first source volume to a first projection surface, and said second projection being from said first source volume to a second projection surface, said second volumetric texture data having been obtained by removing at least a part of said first volumetric texture data that has been successfully projected in said first projection, encode a first geometry picture into said bitstream, said geometry picture representing a mapping of said first projection surface to said first source volume and a mapping of said second projection surface to said first source volume, and encode projection geometry information of said first and second projections into said bitstream, said projection geometry information comprising information of position of said first and second projection surfaces in said scene model.

According to a fourth aspect, there is provided an apparatus comprising at least one processor, memory including computer program code, the memory and the computer program code configured to, with the at least one processor, cause the apparatus to perform at least the following: decode a first texture picture from a bitstream to obtain first and second decoded texture data of a source volume, said first texture picture comprising a first projection of first volumetric texture data of a first source volume of a scene model and a second projection of second volumetric texture data of said first source volume of said scene model, said first projection being from said first source volume to a first projection surface, and said second projection being from said first source volume to a second projection surface, said second volumetric texture data having been obtained by removing at least a part of said first volumetric texture data that has been successfully projected in said first projection, decode a first geometry picture from said bitstream to obtain first and second decoded geometry data of a source volume, said geometry picture representing a mapping of said first projection surface to said first source volume and a mapping of said second projection surface to said first source volume, decode projection geometry information of said first and second projections from said bitstream, said projection geometry information comprising information of position of said first and second projection surfaces in said scene model, and form a reconstructed scene model by projecting said first decoded texture data to a first destination volume using said first decoded geometry data and said first projection geometry information and by projecting said second decoded texture data to said first destination volume using said second decoded geometry data and said projection geometry information.

According to a fifth aspect, there is provided a system comprising at least one processor, memory including computer program code, the memory and the computer program code configured to, with the at least one processor, cause the system to perform at least the following: encode a first texture picture into a bitstream, said first texture picture comprising a first projection of first volumetric texture data of a first source volume of a scene model and a second projection of second volumetric texture data of said first source volume of said scene model, said first projection being from said first source volume to a first projection surface, and said second projection being from said first source volume to a second projection surface, said second volumetric texture data having been obtained by removing at least a part of said first volumetric texture data that has been successfully projected in said first projection, encode a first geometry picture into said bitstream, said geometry picture representing a mapping of said first projection surface to said first source volume and a mapping of said second projection surface to said first source volume, encode projection geometry information of said first and second projections into said bitstream, said projection geometry information comprising information of position of said first and second projection surfaces in said scene model, decode said first texture picture from said bitstream to obtain first and second decoded texture data of a source volume, decode said first geometry picture from said bitstream to obtain first and second decoded geometry data of a source volume, decode said projection geometry information of said first and second projections from said bitstream, and form a reconstructed scene model by projecting said first decoded texture data to a first destination volume using said first decoded geometry data and said first projection geometry information and by projecting said second decoded texture data to said first destination volume using said second decoded geometry data and said first projection geometry information.

According to further aspects, there are provided computer program products embodied on a non-transitory computer readable medium, comprising computer program code configured to, when executed on at least one processor, cause an apparatus or a system to carry out the method according to the first or second aspect.

DESCRIPTION OF THE DRAWINGS

In the following, various embodiments of the invention will be described in more detail with reference to the appended drawings, in which

FIGS. 5a, 5b and 5c illustrate projection of source volumes in a scene and parts of an object to projection surfaces, as well as determining depth information;

FIGS. 7a, 7b and 7c illustrate a sequential decimating projection and the corresponding directions, as well as a non-orthogonal projection;

DESCRIPTION OF EXAMPLE EMBODIMENTS

In the following, several embodiments of the invention will be described in the context of point cloud, voxel or mesh scene models for three-dimensional volumetric video and pixel and picture based two-dimensional video coding. It is to be noted, however, that the invention is not limited to specific scene models or specific coding technologies. In fact, the different embodiments have applications in any environment where coding of volumetric scene model data is required.

It has been noticed here that identifying correspondences for motion-compensation in three-dimensional space is an ill-defined problem, as both the geometry and the respective attributes of the objects to be coded may change. For example, temporal successive "frames" do not necessarily have the same number of meshes, points or voxel. Therefore, compression of dynamic 3D scene models is inefficient.

Figure 1:
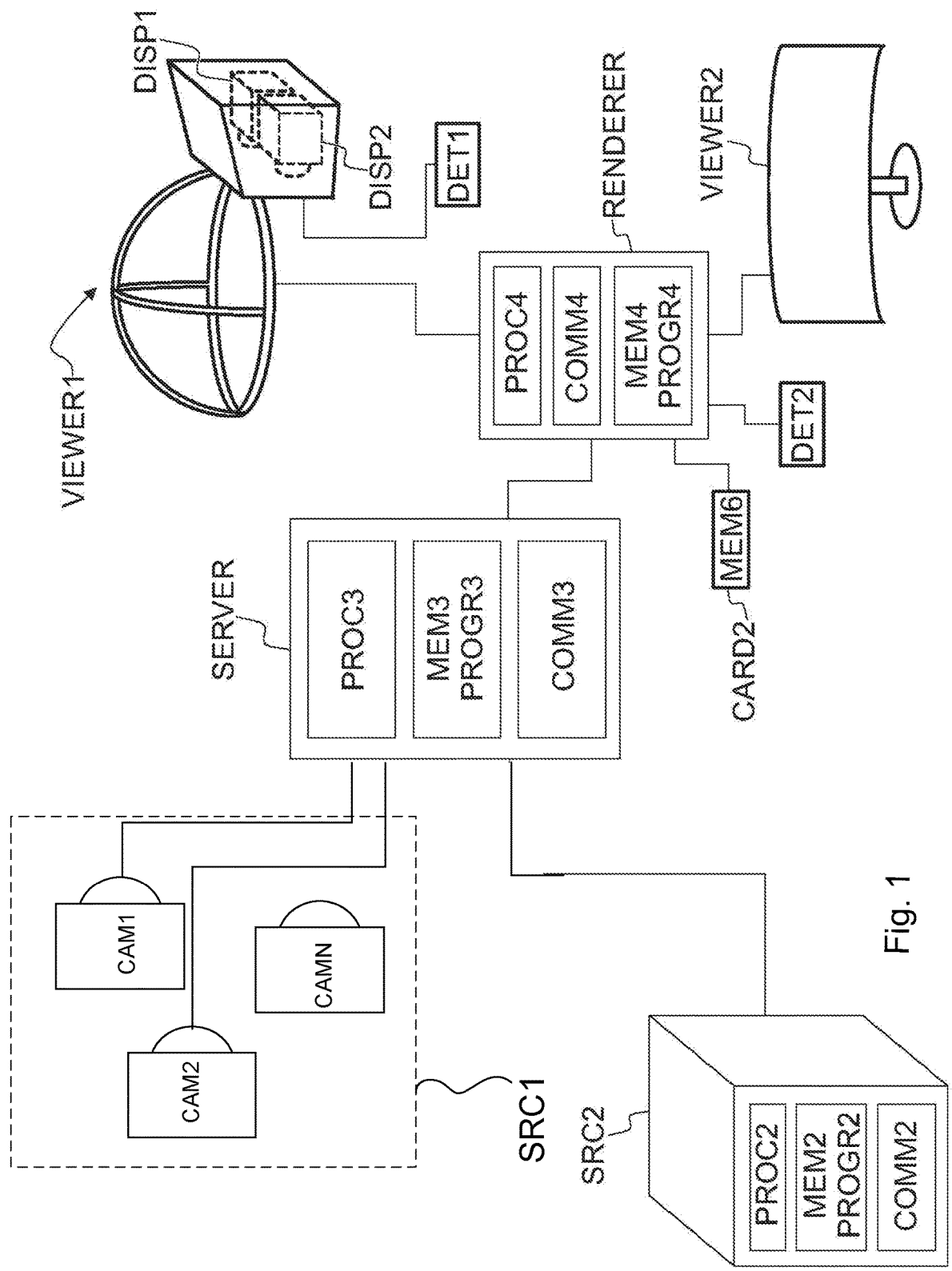
FIG. 1 shows a system for capturing, encoding, decoding, reconstructing and viewing a three-dimensional scheme.

FIG. 1 shows a system for capturing, encoding, decoding, reconstructing and viewing a three-dimensional scheme, that is, for 3D video and 3D audio digital creation and playback. The task of the system is that of capturing sufficient visual and auditory information from a specific scene to be able to create a scene model such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video source SRC1 may comprise multiple cameras CAM1, CAM2, ..., CAMN with overlapping field of view so that regions of the view around the video capture device is captured from at least two cameras. The video source SRC1 may comprise multiple microphones to capture the timing and phase differences of audio originating from different directions. The video source SRC1 may comprise a high resolution orientation sensor so that the orientation (direction of view) of the plurality of cameras CAM1, CAM2, ..., CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, ..., CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively or in addition to the source device SRC1 creating information for forming a scene model, one or more sources SRC2 of synthetic imagery may be present in the system, comprising a scene model. Such sources may be used to create and transmit the scene model and its development over time, e.g. instantaneous states of the model. The model can be created or provided by the source SRC1 and/or SRC2, or by the server SERVER. Such sources may also use the model of the scene to compute various video bitstreams for transmission.

One or more two-dimensional video bitstreams for viewing may be computed at the server SERVER or a device RENDERER used for rendering, or another device at the receiving end. When such computed video streams are used for viewing, the viewer may see a three-dimensional virtual world as described in the context of FIGS. 4a-4d. The devices SRC1 and SRC2 may comprise or be functionally connected to a computer processors (PROC2 shown) and memory (MEM2 shown), the memory comprising computer program (PROGR2 shown) code for controlling the source device SRC1/SRC2. The image stream captured by the device and the scene model may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

The creation of a three-dimensional scene model may take place at the server SERVER or another device by using the images captured by the devices SRC1. The scene model may be a model created from captured image data (a real world model), or a synthetic model such as on device SRC2, or a combination of such. As described later, the scene model may be encoded to reduce its size and transmitted to a decoder, for example viewer devices.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream and for decoding the video data stream. The video data stream may be received from the server SERVER or from some other entity, such as a proxy server, an edge server of a content delivery network, or a file available locally in the viewer device. The data stream may be received over a network connection through communications interface COMM4, or from a memory device MEM6 like a memory card CARD2. The viewer devices may have a graphics processing unit for processing of the data to a suitable format for viewing. The viewer VIEWER1 may comprise a high-resolution stereo-image head-mounted display for viewing the rendered stereo video sequence. The head-mounted display may have an orientation sensor DET1 and stereo audio headphones. The viewer VIEWER2 may comprise a display (either two-dimensional or a display enabled with 3D technology for displaying stereo video), and the rendering device may have an orientation detector DET2 connected to it. Alternatively, the viewer VIEWER2 may comprise a 2D display, since the volumetric video rendering can be done in 2D by rendering the viewpoint from a single eye instead of a stereo eye pair.

It needs to be understood that FIG. 1 depicts one SRC1 device and one SRC2 device, but generally the system may comprise more than one SRC1 device and/or SRC2 device.

Any of the devices (SRC1, SRC2, SERVER, RENDERER, VIEWER1, VIEWER2) may be a computer or a portable computing device, or be connected to such. Moreover, even if the devices (SRC1, SRC2, SERVER, RENDERER, VIEWER1, VIEWER2) are depicted as a single device in FIG. 1, they may comprise multiple parts or may be comprised of multiple connected devices. For example, it needs to be understood that SERVER may comprise several devices, some of which may be used for editing the content produced by SRC1 and/or SRC2 devices, some others for compressing the edited content, and a third set of devices may be used for transmitting the compressed content. Such devices may have computer program code for carrying out methods according to various examples described in this text.

Figure 2A:
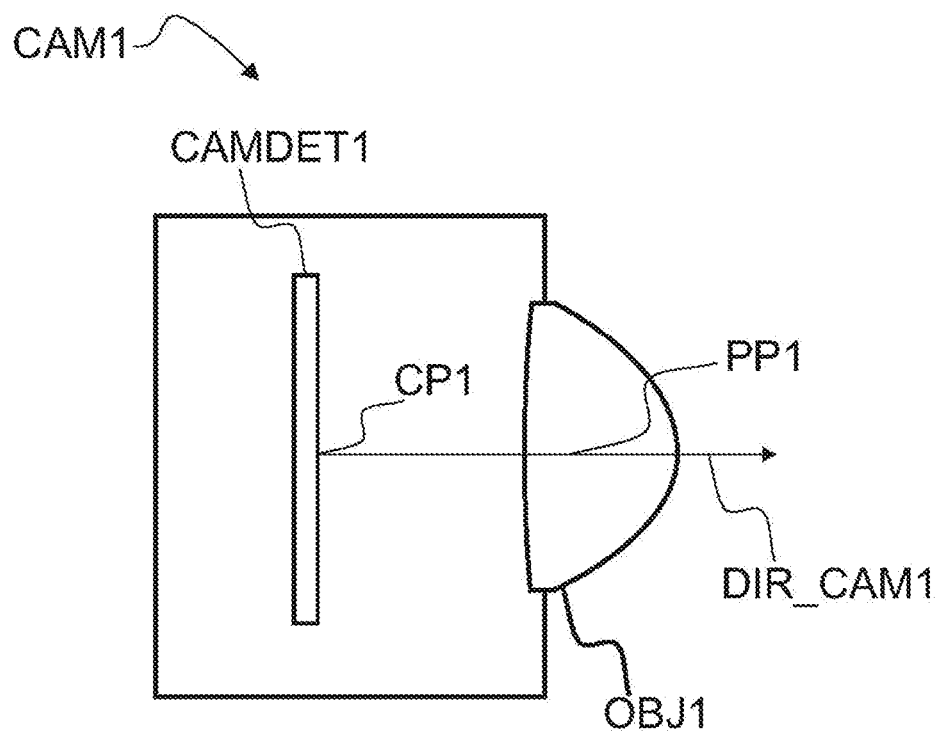
FIGS. 2a and 2b show a capture device and a viewing device.
Figure 2B:
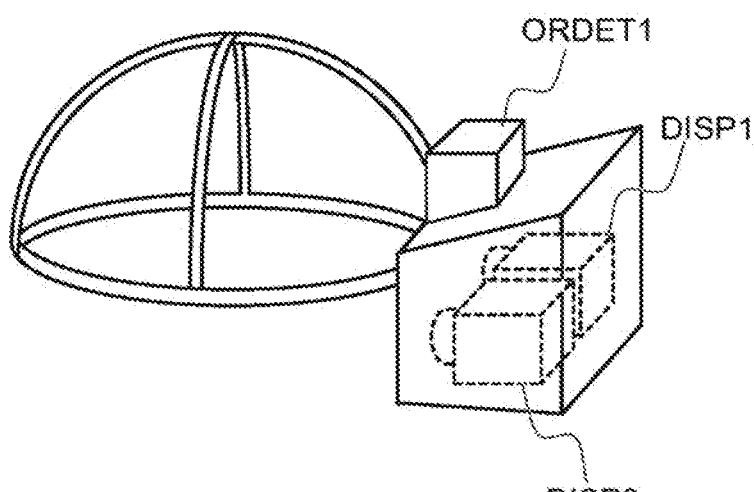

FIGS. 2a and 2b show a capture device and a viewing device. FIG. 2a illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video, audio and orientation data is first recorded with the capture device. This can consist of multiple concurrent video and audio streams as described above. One or more time-synchronized audio streams may also be recorded with the capture devices. The different capture devices may form image and geometry information of the scene from different directions. For example, there may be three, four, five, six or more cameras capturing the scene from different sides, like front, back, left and right, and/or at directions between these, as well as from the top or bottom, or any combination of these. The cameras may be at different distances, for example some of the cameras may capture the whole scene and some of the cameras may be capturing one or more objects in the scene. In an arrangement used for capturing volumetric video data, several cameras may be directed towards an object, looking onto the object from different directions, where the object is e.g. in the middle of the cameras. In this manner, the texture and geometry of the scene and the objects within the scene may be captured adequately. As mentioned earlier, the cameras or the system may comprise means for determining geometry information, e.g. depth data, related to the captured video streams. From these concurrent video and audio streams, a computer model of a scene may be created. Alternatively or additionally, a synthetic computer model of a virtual scene may be used. The models (at successive time instances) are then transmitted immediately or later to the storage and processing network for processing and conversion into a format suitable for subsequent delivery to playback devices. The conversion may involve processing and coding to improve the quality and/or reduce the quantity of the scene model data while preserving the quality at a desired level. Each playback device receives a stream of the data (either computed video data or scene model data) from the network, and renders it into a viewing reproduction of the original location which can be experienced by a user. The reproduction may be two-dimensional or three-dimensional (stereo image pairs).

Figure 3A:
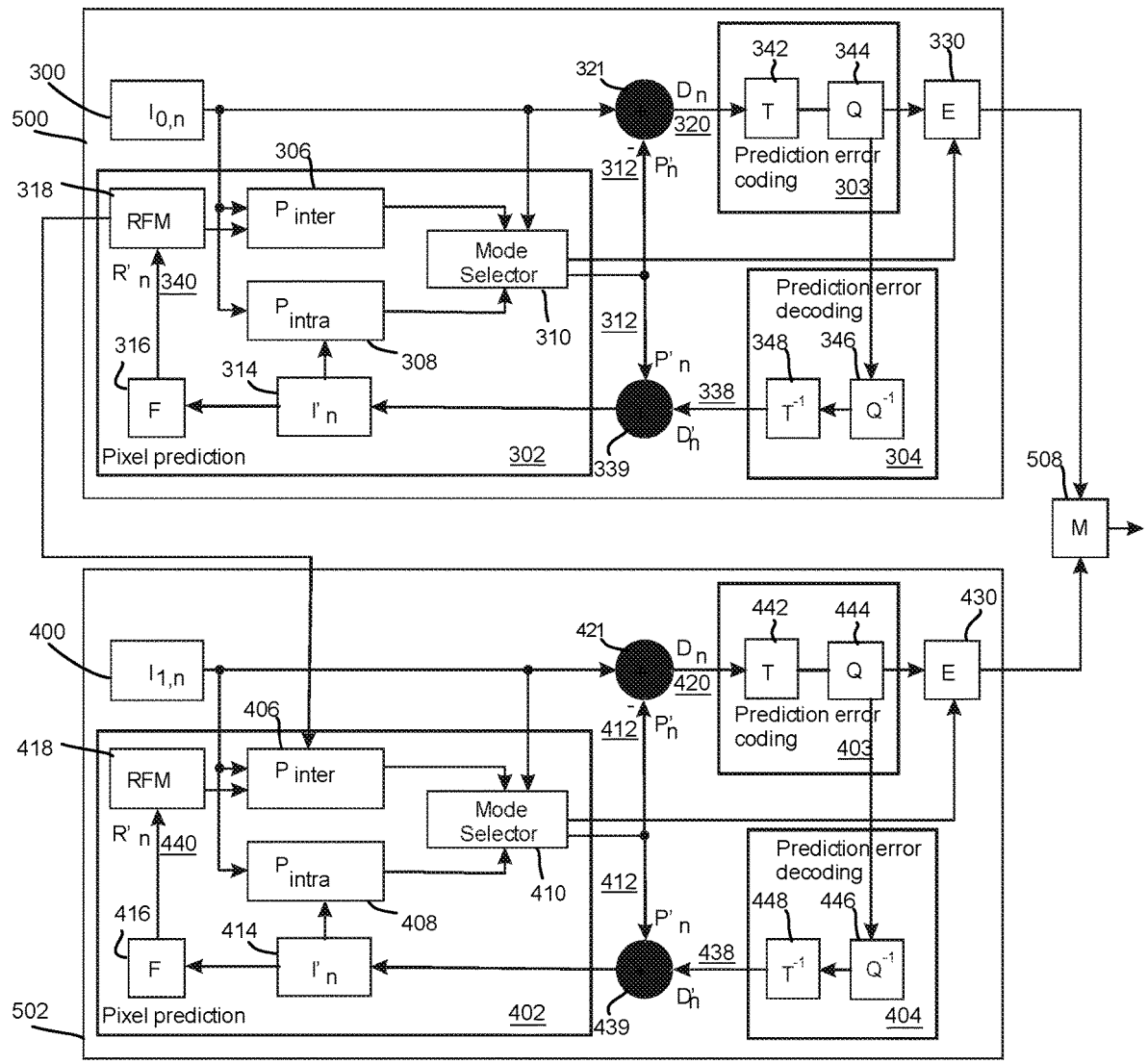
FIGS. 3a and 3b show an encoder and decoder for encoding and decoding texture pictures, geometry pictures and/or auxiliary pictures.

FIG. 3a shows a block diagram of a video encoder suitable for encoding video data in this context. FIG. 3a presents an encoder for two layers, but it would be appreciated that presented encoder could be similarly simplified to encode only one layer or extended to encode more than two layers. FIG. 3a illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 3a also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability.

The outputs of the entropy encoders 330, 430 may be inserted into a bitstream e.g. by a multiplexer 508.

Figure 3B:
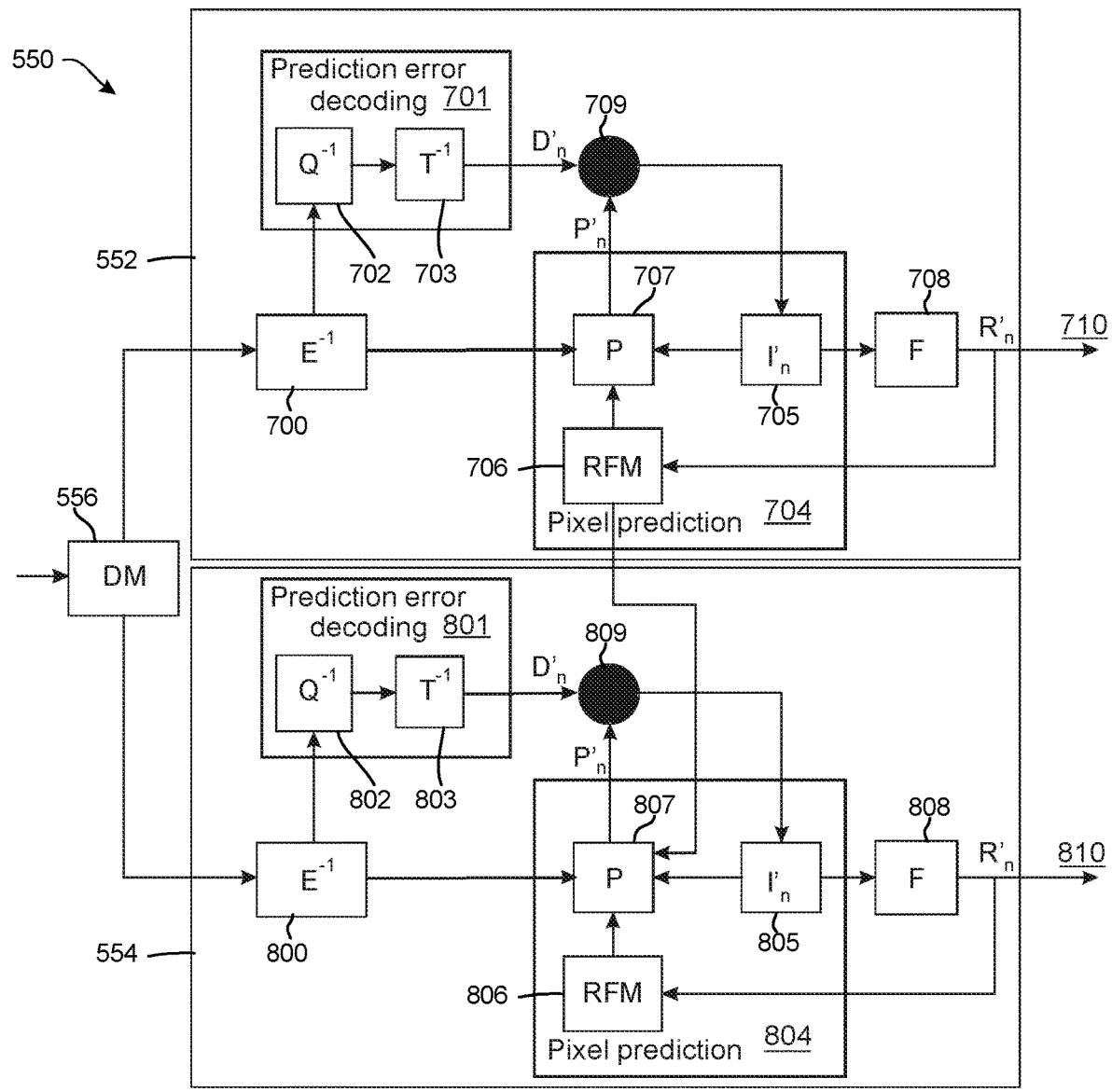

FIG. 3b shows a block diagram of a video decoder suitable for employing embodiments of the invention. FIG. 3b depicts a structure of a two-layer decoder, but it would be appreciated that the decoding operations may similarly be employed in a single-layer decoder.

The video decoder 550 comprises a first decoder section 552 for base layer pictures and a second decoder section 554 for enhancement layer pictures. Block 556 illustrates a demultiplexer for delivering information regarding base layer pictures to the first decoder section 552 and for delivering information regarding enhancement layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform (T-1). Blocks 702, 802 illustrate inverse quantization (Q-1). Blocks 700, 800 illustrate entropy decoding (E-1). Blocks 706, 806 illustrate a reference frame memory (RFM). Blocks 707, 807 illustrate prediction (P) (either inter prediction or intra prediction). Blocks 708, 808 illustrate filtering (F). Blocks 709, 809 may be used to combine decoded prediction error information with predicted base or enhancement layer pictures to obtain the preliminary reconstructed images (I'n). Preliminary reconstructed and filtered base layer pictures may be output 710 from the first decoder section 552 and preliminary reconstructed and filtered enhancement layer pictures may be output 810 from the second decoder section 554.

Herein, the decoder could be interpreted to cover any operational unit capable to carry out the decoding operations, such as a player, a receiver, a gateway, a demultiplexer and/or a decoder.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream may consist of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In scalable video coding schemes, a video signal may be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level, and can be extracted from the original bitstream and decoded to produce a representation of the original signal at certain fidelity.

Scalability modes or scalability dimensions may include but are not limited to the following:

- Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.
- Spatial scalability: Base layer pictures are coded at a lower resolution (i.e. have fewer samples) than enhancement layer pictures. Spatial scalability and quality scalability may sometimes be considered the same type of scalability.
- Bit-depth scalability: Base layer pictures are coded at lower bit-depth (e.g. 8 bits) than enhancement layer pictures (e.g. 10 or 12 bits).
- Dynamic range scalability: Scalable layers represent a different dynamic range and/or images obtained using a different tone mapping function and/or a different optical transfer function.
- Chroma format scalability: Base layer pictures provide lower spatial resolution in chroma sample arrays (e.g. coded in 4:2:0 chroma format) than enhancement layer pictures (e.g. 4:4:4 format).
- Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.
- View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.
- Depth scalability, which may also be referred to as depth-enhanced coding. A layer or some layers of a bitstream may represent texture view(s), while other layer or layers may represent depth view(s).
- Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching.

Scalability may be enabled in two basic ways, either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder.

Figure 4A:
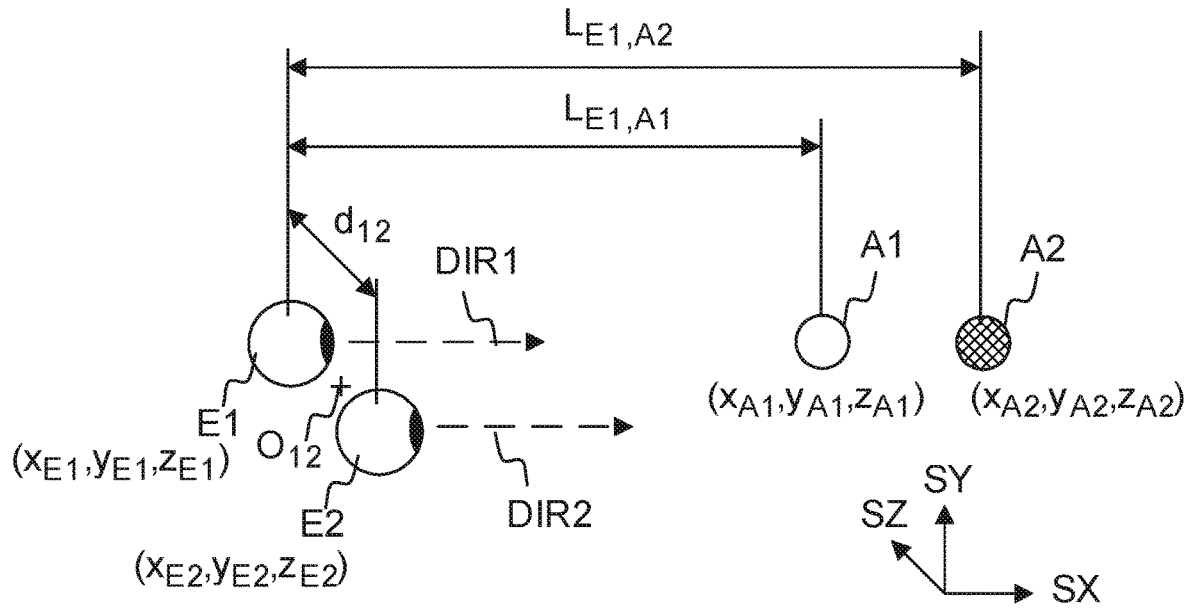
FIGS. 4a, 4b, 4c and 4d show a setup for forming a stereo image of a scene to a user.

FIGS. 4a, 4b, 4c and 4d show a setup for forming a stereo image of a scene to a user, for example a video frame of a 3D video. In FIG. 4a, a situation is shown where a human being is viewing two spheres A1 and A2 using both eyes E1 and E2. The sphere A1 is closer to the viewer than the sphere A2, the respective distances to the first eye E1 being $L_{E1,A1}$ and $L_{E1,A2}$. The different objects reside in space at their respective (x,y,z) coordinates, defined by the coordinate system SZ, SY and SZ. The distance $d_{12}$ between the eyes of a human being may be approximately 62-64 mm on average, and varying from person to person between 55 and 74 mm. This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

When the viewer's body (thorax) is not moving, the viewer's head orientation is restricted by the normal anatomical ranges of movement of the cervical spine.

In the setup of FIG. 4a, the spheres A1 and A2 are in the field of view of both eyes. The center-point $O_{12}$ between the eyes and the spheres are on the same line. That is, from the center-point, the sphere A2 is behind the sphere A1. However, each eye sees part of sphere A2 from behind A1, because the spheres are not on the same line of view from either of the eyes.

Figure 4B:
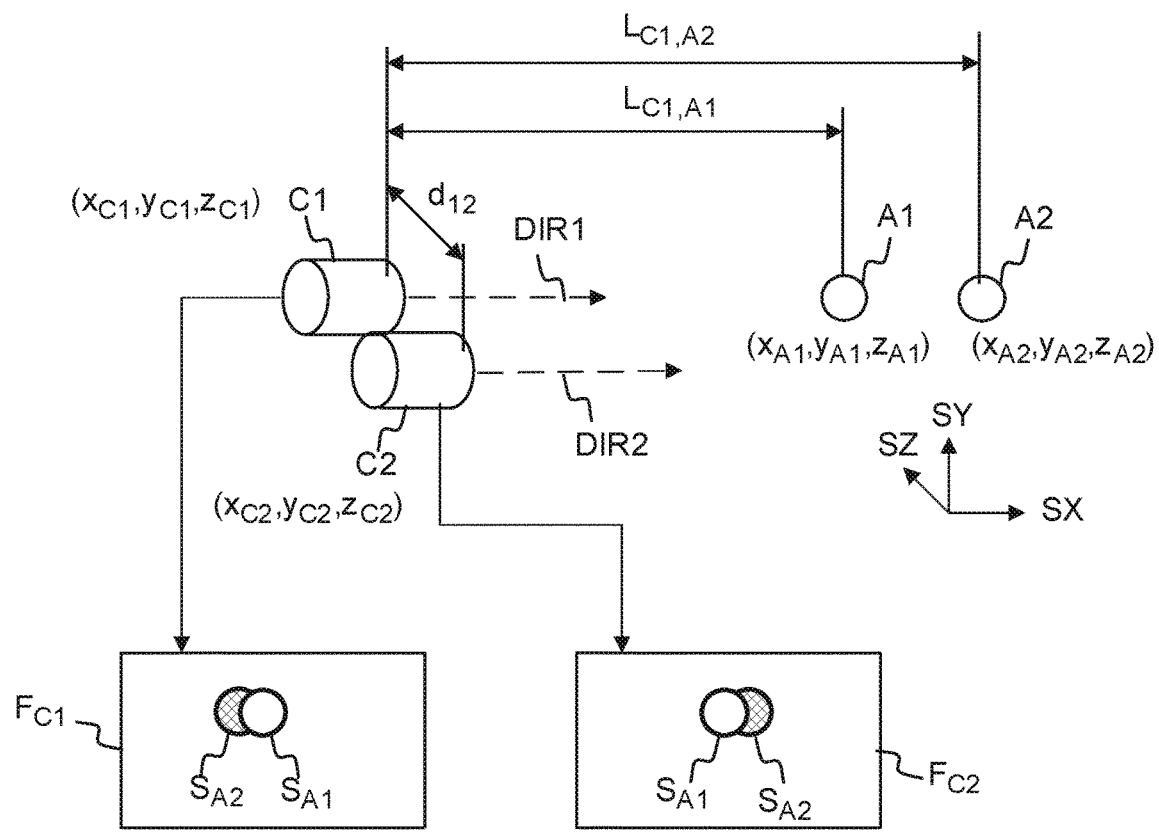

In FIG. 4b, there is a setup shown, where the eyes have been replaced by cameras C1 and C2, positioned at the location where the eyes were in FIG. 4a. The distances and directions of the setup are otherwise the same. Naturally, the purpose of the setup of FIG. 4b is to be able to take a stereo image of the spheres A1 and A2. The two images resulting from image capture are $F_{C1}$ and $F_{C2}$. The "left eye" image $F_{C1}$ shows the image $S_{A2}$ of the sphere A2 partly visible on the left side of the image $S_{A1}$ of the sphere A1. The "right eye" image $F_{C2}$ shows the image $S_{A2}$ of the sphere A2 partly visible on the right side of the image $S_{A1}$ of the sphere A1. This difference between the right and left images is called disparity, and this disparity, being the basic mechanism with which the HVS determines depth information and creates a 3D view of the scene, can be used to create an illusion of a 3D image.

In this setup of FIG. 4b, where the inter-eye distances correspond to those of the eyes in FIG. 4a, the camera pair C1 and C2 has a natural parallax, that is, it has the property of creating natural disparity in the two images of the cameras. Natural disparity may be understood to be created even though the distance between the two cameras forming the stereo camera pair is somewhat smaller or larger than the normal distance (parallax) between the human eyes, e.g. essentially between 40 mm and 100 mm or even 30 mm and 120 mm.

It needs to be understood here that the images $F_{C1}$ and $F_{C2}$ may be captured by cameras C1 and C2, where the cameras C1 and C2 may be real-world cameras or they may be virtual cameras. In the case of virtual cameras, the images $F_{C1}$ and $F_{C2}$ may be computed from a computer model of a scene by setting the direction, orientation and viewport of the cameras C1 and C2 appropriately such that a stereo image pair suitable for viewing by the human visual system (HVS) is created.

Figure 4C:
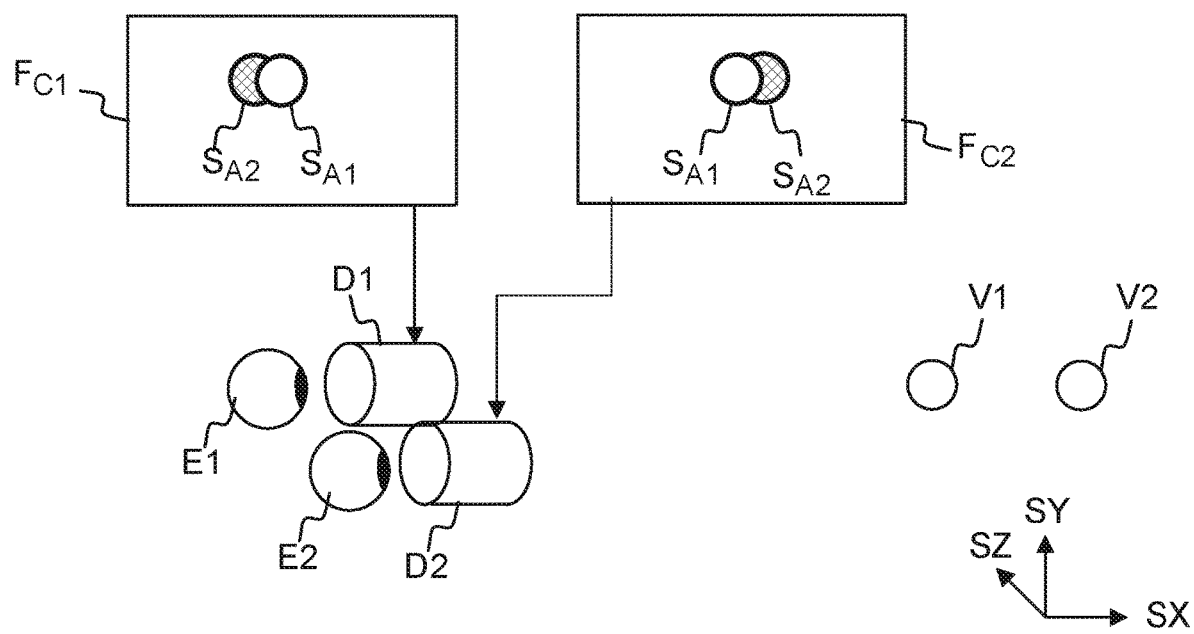

In FIG. 4c, the creating of this 3D illusion is shown. The images $F_{C1}$ and $F_{C2}$ captured or computed by the cameras C1 and C2 are displayed to the eyes E1 and E2, using displays D1 and D2, respectively. The disparity between the images is processed by the HVS so that an understanding of depth is created. That is, when the left eye sees the image $S_{A2}$ of the sphere A2 on the left side of the image $S_{A1}$ of sphere A1, and respectively the right eye sees the image of A2 on the right side, the HVS creates an understanding that there is a sphere V2 behind the sphere V1 in a three-dimensional world. Here, it needs to be understood that the images $F_{C1}$ and $F_{C2}$ can also be synthetic, that is, created by a computer. If they carry the disparity information, synthetic images will also be seen as three-dimensional by the HVS. That is, a pair of computer-generated images can be formed so that they can be used as a stereo image.

Figure 4D:
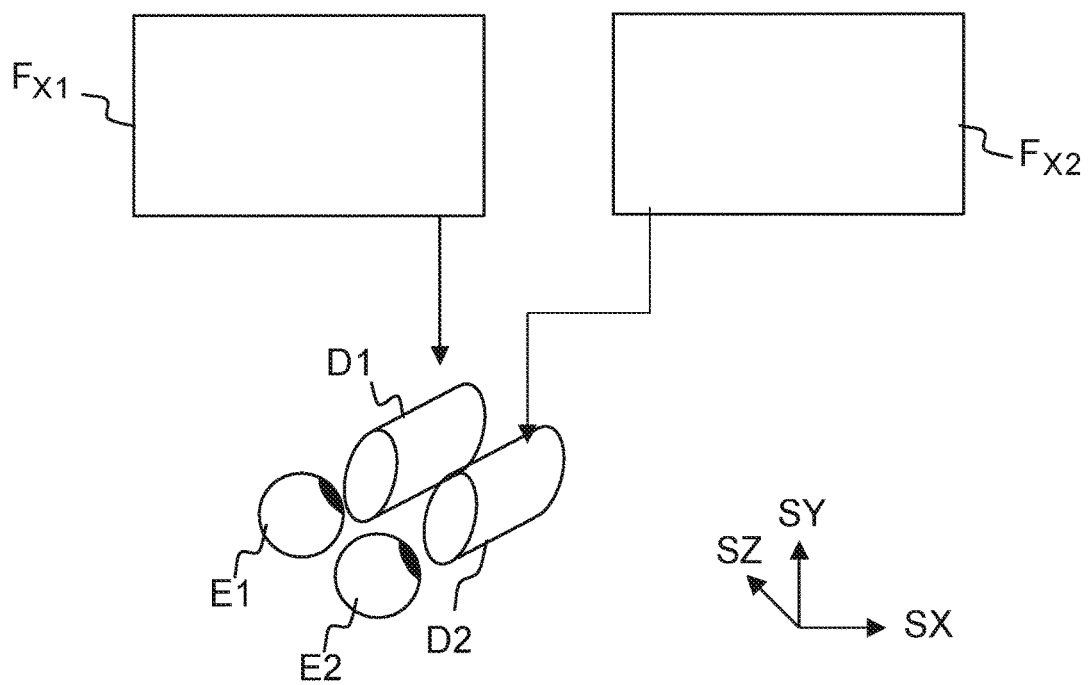

FIG. 4d illustrates how the principle of displaying stereo images to the eyes can be used to create 3D movies or virtual reality scenes having an illusion of being three-dimensional. The images $F_{X1}$ and $F_{X2}$ are either captured with a stereo camera or computed from a model so that the images have the appropriate disparity. By displaying a large number (e.g. 30) frames per second to both eyes using display D1 and D2 so that the images between the left and the right eye have disparity, the HVS will create a cognition of a moving, three-dimensional image.

The field of view represented by the content may be greater than the displayed field of view e.g. in an arrangement depicted in FIG. 4d. Consequently, only a part of the content along the direction of view (a.k.a. viewing orientation) is displayed at a single time. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

The content may enable viewing from several viewing positions within the 3D space. The texture picture(s), the geometry picture(s) and the geometry information may be used to synthesize the images $F_{X1}$ and/or $F_{X2}$ as if the displayed content was captured by camera(s) located at the viewing position.

The principle illustrated in FIGS. 4a-4d may be used to create a three-dimensional images to a viewer from a three-dimensional scene model (volumetric video) after the scene model has been encoded at the sender and decoded and reconstructed at the receiver. Because volumetric video describes a 3D scene or object at different (successive) time instances, such data can be viewed from any viewpoint. Therefore, volumetric video is an important format for any augmented reality, virtual reality and mixed reality applications, especially for providing viewing capabilities having six degrees of freedom (so-called 6DOF viewing).

FIGS. 5a, 5b and 5c illustrate projection of source volumes in a digital scene model SCE and parts of an object model OBJ1, OBJ2, OBJ3, BG4 to projection surfaces S1, S2, S3, S4, as well as determining depth information for the purpose of encoding volumetric video.

The projection of source volumes SV1, SV2, SV3, SV4 may result in texture pictures and geometry pictures, and there may be geometry information related to the projection source volumes and/or projection surfaces. Texture pictures, geometry pictures and projection geometry information may be encoded into a bitstream. A texture picture may comprise information on the color data of the source of the projection. Through the projection, such color data may result in pixel color information in the texture picture. Pixels may be coded in groups, e.g. coding units of rectangular shape. The projection geometry information may comprise but is not limited to one or more of the following:
  projection type, such as planar projection or equirectangular projection
  projection surface type, such as a cube
  location of the projection surface in 3D space
  orientation of the projection surface in 3D space
  size of the projection surface in 3D space
  type of a projection center, such as a projection center point, axis, or plane
  location and/or orientation of a projection center.

The projection may take place by projecting the geometry primitives (points of a point could, triangles of a triangle mesh or voxels of a voxel array) of a source volume SV1, SV2, SV3, SV4 (or an object OBJ1, OBJ2, OBJ3, BG4) onto a projection surface S1, S2, S3, S4. The projection surface or a number of projection surfaces together may surround the source volume at least partially such that projection of the primitives happens from the center of the projection surface outwards to the surface. For example, a cylindrical surface has a center axis and a spherical surface has a center point. A cubical or rectangular surface may have center planes or a center axis and the projection of the geometry primitives may take place either orthogonally to the sides of the surface or from the center axis outwards to the surface. The projection surfaces, e.g. cylindrical and rectangular, may be open from the top and the bottom such that when the surface is cut and rolled out on a two-dimensional plane, it forms a rectangular shape. Such rectangular shape with pixel data can be encoded and decoded with a video codec.

Alternatively or in addition, the projection surface such as a planar surface or a sphere may be inside group of geometry primitives, e.g. inside a point cloud that defines a surface. In the case of an inside projection surface, the projection may take place from outside in towards the center and may result in sub-sampling of the texture data of the source.

In a point cloud based scene model or object model, points may be represented with any floating point coordinates. A quantized point cloud may be used to reduce the amount of data, whereby the coordinate values of the point cloud are represented e.g. with 10-bit, 12-bit or 16-bit integers. Integers may be used because hardware accelerators may be able to operate on integers more efficiently. The points in the point cloud may have associated colour, reflectance, opacity etc. texture values. The points in the point cloud may also have a size, or a size may be the same for all points. The size of the points may be understood as indicating how large an object the point appears to be in the model in the projection. The point cloud is projected by ray casting from the projection surface to find out the pixel values of the projection surface. In such a manner, the topmost point remains visible in the projection, while points closer to the center of the projection surface may be occluded. In other words, in general, the original point cloud, meshes, voxels, or any other model is projected outwards to a simple geometrical shape, this simple geometrical shape being the projection surface.

Different projection surfaces may have different characteristics in terms of projection and reconstruction. In the sense of computational complexity, a projection to a cubical surface may be the most efficient, and a cylindrical projection surface may provide accurate results efficiently. Also cones, polyhedron-based parallelepipeds (hexagonal or octagonal, for example) and spheres or a simple plane may be used as projection surfaces.

The phrase along the bitstream (e.g. indicating along the bitstream) may be defined to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream. For example, an indication along the bitstream may refer to metadata in a container file that encapsulates the bitstream.

FIG. 5a illustrates the principle of projection. A first texture picture may be encoded into a bitstream, and the first texture picture may comprise a first projection of texture data of a first source volume SV1 of a scene model SCE onto a first projection surface S1. The scene model SCE may comprise a number of further source volumes SV2, SV3, SV4.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (in this example, depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

A picture may be defined to be either a frame or a field. A frame may be defined to comprise a matrix of luma samples and possibly the corresponding chroma samples. A field may be defined to be a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In some coding systems, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

Texture picture(s) and the respective geometry picture(s) may have the same or different chroma format.

Depending on the context, a pixel may be defined to a be a sample of one of the sample arrays of the picture or may be defined to comprise the collocated samples of all the sample arrays of the picture.

Multiple source volumes (objects) may be encoded as texture pictures, geometry pictures and projection geometry information into the bitstream in a similar manner. That is, as in FIG. 5a, the scene model SCE may comprise multiple objects OBJ1, OBJ2, OBJ3, BG4, and these may be treated as source volumes SV1, SV2, SV3, SV4 and each object may be coded as a texture picture, geometry picture and projection geometry information. As shown in FIG. 5b, a single object may be composed of different parts and thus different source volumes V11, V12, V13, V14 and corresponding projection surfaces S11, S12, S13, S14 may be used for these different parts.

In the above, the first texture picture of the first source volume SV1 and further texture pictures of the other source volumes SV2, SV3, SV4 may represent the same time instance. That is, there may be a plurality of texture and geometry pictures and projection geometry information for one time instance, and the other time instances may be coded in a similar manner. Since the various source volumes are in this way producing sequences of texture pictures and sequences of geometry pictures, as well as sequences of projection geometry information. The inter-picture redundancy in the picture sequences can be used to encode the texture and geometry data for the source volumes efficiently, compared to the presently known ways of encoding volume data.

An object BG4 (source volume SV4) may be projected onto a projection surface S4 and encoded into the bitstream as a texture picture, geometry picture and projection geometry information as described above. Furthermore, such source volume may be indicated to be static by encoding information into said bitstream on said fourth projection geometry being static. A static source volume or object may be understood to be an object whose position with respect to the scene model remains the same over two or more or all time instances of the video sequence. For such static source volume, the geometry data (geometry pictures) may also stay the same, that is, the object's shape remains the same over two or more time instances. For such static source volume, some or all of the texture data (texture pictures) may stay the same over two or more time instances. By encoding information into the bitstream of the static nature of the source volume the encoding efficiency may be further improved, as the same information may not need to be coded multiple times. In this manner, the decoder will also be able to use the same reconstruction or partially same reconstruction of the source volume (object) over multiple time instances.

In an analogous manner, the different source volumes may be coded into the bitstream with different frame rates. For example, a slow-moving or relatively unchanging object (source volume) may be encoded with a first frame rate, and a fast-moving and/or changing object (source volume) may be coded with a second frame rate. The first frame rate may be slower than the second frame rate, for example one half or one quarter of the second frame rate, or even slower. For example, if the second frame rate is 30 frames per second, the second frame rate may be 15 frames per second, or 1 frame per second. The first and second object (source volumes) may be "sampled" in synchrony such that some frames of the faster frame rate coincide with frames of the slower frame rate.

There may be one or more coordinate systems in the scene model. The scene model may have a coordinate system and one or more of the objects (source volumes) in the scene model may have their local coordinate systems. The shape, size, location and orientation of one or more projection surfaces may be encoded into or along the bitstream with respect to coordinates of the scene model or said first source volume.

Alternatively or in addition, the encoding may be done with respect to model coordinates. The choice of coordinate systems may improve the coding efficiency.

Information on temporal changes in location, orientation and size of one or more said projection surfaces may be encoded into or along the bitstream. For example, if one or more of the objects (source volumes) being encoded is moving or rotating with respect to the scene model, the projection surface moves or rotates with the object to preserve the projection as similar as possible.

If the projection volumes are changing, for example splitting or bending into two parts, the projection surfaces may be sub-divided respectively. Therefore, information on sub-division of one or more of the source volumes and respective changes in one or more of the projection surfaces may be encoded into or along the bitstream.

The resulting bitstream may then be output to be stored or transmitted for later decoding and reconstruction of the scene model.

Decoding of the information from the bitstream may happen in analogous manner. A first texture picture may be decoded from a bitstream to obtain first decoded texture data, where the first texture picture comprises a first projection of texture data of a first source volume of the scene model to be reconstructed onto a first projection surface. The scene model may comprise a number of further source volumes. Then, a first geometry picture may be decoded from the bitstream to obtain first decoded scene model geometry data. The first geometry picture may represent a mapping of the first projection surface to the first source volume. First projection geometry information of the first projection may be decoded from the bitstream, the first projection geometry information comprising information of position of the first projection surface in the scene model. Using this information, a reconstructed scene model may be formed by projecting the first decoded texture data to a first destination volume using the first decoded scene model geometry data and said first projection geometry information to determine where the decoded texture information is to be placed in the scene model.

A 3D scene model may be classified into two parts: first, all dynamic parts, and second all static parts. The dynamic part of the 3D scene model may be further sub-divided into separate parts, each representing objects (or parts of) an object in the scene model, that is, source volumes. The static parts of the scene model may include e.g. static room geometry (walls, ceiling, fixed furniture) and may be compressed either by known volumetric data compression solutions, or, similar to the dynamic part, sub-divided into individual objects for projection-based compression as described earlier, to be encoded into the bitstream.

In an example, some objects may be a chair (static), a television screen (static geometry, dynamic texture), a moving person (dynamic). For each object, a suitable projection geometry (surface) may be found, e.g. cube projection to represent the chair, another cube for the screen, a cylinder for the person's torso, a sphere for a detailed representation of the person's head, and so on. The 3D data of each object may then be projected onto the respective projection surface and 2D planes are derived by "unfolding" the projections from three dimensions to two dimensions (plane). The unfolded planes will have several channels, typically three for the colour representation of the texture, e.g. RGB, YUV, and one additional plane for the geometry (depth) of each projected point for later reconstruction.

Frame packing may be defined to comprise arranging more than one input picture, which may be referred to as (input) constituent frames, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

As volumetric video compression currently suffers from poor temporal compression performance, it has been noticed that this projecting of volumetric models onto 2D planes allows for using standard 2D video coding tools with efficient temporal compression. Thus, coding efficiency may be increased.

Using source volume projections onto projection surfaces instead of prior-art 2D-video based approaches, i.e. multi-view and depth approaches, may provide better coverage of the scene model (or object). Thus, it has been noticed that 6DOF capabilities may be improved. Using several projection surface geometries for individual objects may improve the coverage of the scene model even further. Furthermore, standard video encoding hardware may be utilized for real-time compression/decompression of the projection surfaces (that have been unfolded onto planes). The projection and reverse projection steps may be of low complexity.

Performance tests have shown improvements in coding efficiency using projection-based coding compared to currently known volumetric data compression solutions. Following the measurement procedure laid out in the ISO/IEC JTC1/SC29/WG11 (MPEG) Call for Proposals for Point Cloud Compression V2 [ISO/IEC JTC1/SC29/WG11 MPEG2017/N16763], required bit rates could be reduced by 87% with respect to point-to-point geometry distortion, 70% with respect to point-to-plane geometry distortion and 56% with respect to YUV colour distortion.

Simple objects might suffice to be projected and coded with a single projection. Complex objects or larger scene models may require several (different) projections. The projection geometry may remain constant over a volumetric video sequence, but the location and orientation of the projection surfaces in space can change (and can be possibly be predicted in the encoding, wherein the difference from the prediction is encoded).

Depth may be coded "outside-in" (indicating the distance from the projection surface to the coded point), or "inside-out" (indicating the distance from the projection center point or axis to the coded point). In inside-out coding, depth of each projected point may be positive (with positive distance PD1) or negative (with negative distance ND2). As shown in FIG. 5c, the center of projection cylinder or sphere may fall outside of the 3D object OBJ1, especially when the object is concave. In this case, two surfaces may be projected on one side of the cylinder (P1), so the inner surface is occluded by the outer surface. However, the other side of the cylinder projection is empty and the inner content may be projected onto the other side of the cylinder (P2). As a result, more content of the 3D object may be mapped to the cylinder projection, using negative depth information ND2. Therefore, in the projection with negative depth ND2, there may be projected information in places where there otherwise would not be. This may enable the object to be reconstructed better.

Figure 6A:
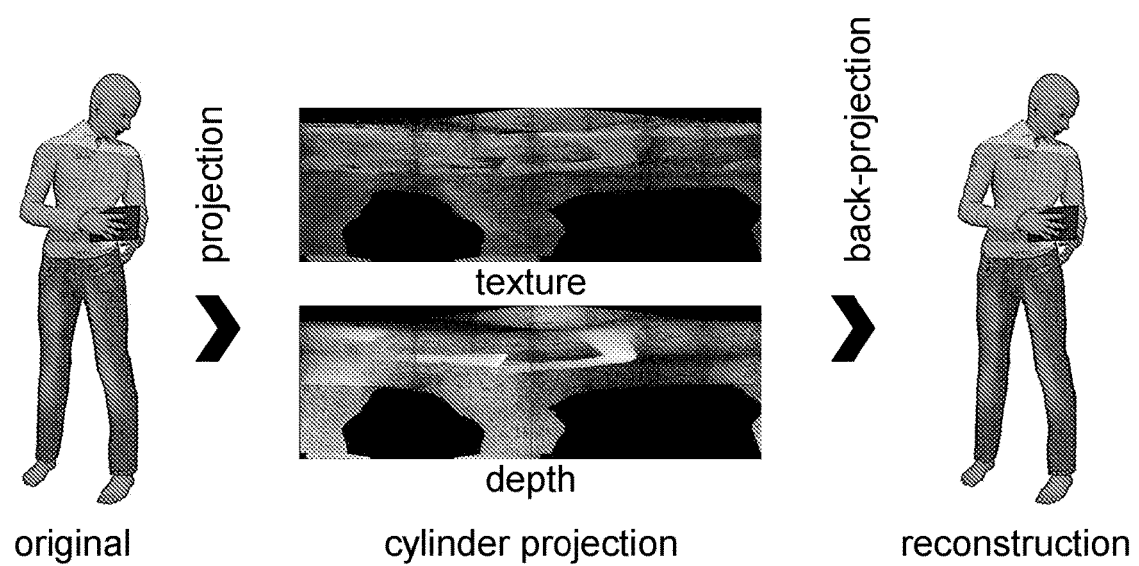
FIGS. 6a and 6b show a projection of a source volume to a projection surface, and inpainting of a sparse projection.
Figure 6B:
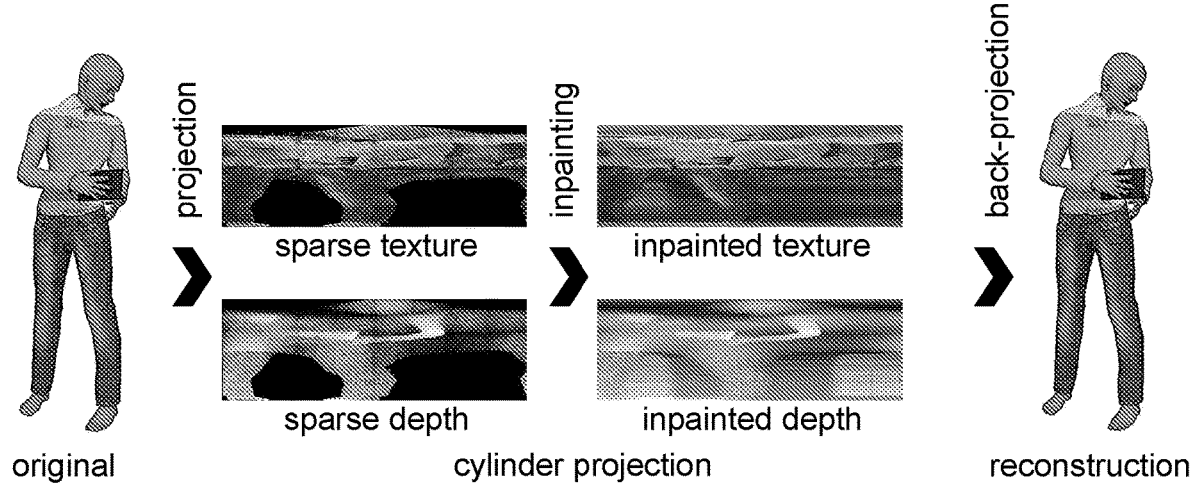

A negative depth projection may be described in the following steps:
  project all points onto a projection surface, e.g. cylinder, position the "unfolded" cylinder onto image plane
  check for each x,y position of image plane if it has multiple points of the source volume assigned to it OR alternatively compare radius of a point to its neighboring points neighborhood to see if point is part of the same surface,
  keep the point with the largest radius,
  try to write the point with the smallest radius to the "opposite" side (180 degree shift), only if there is no point already mapped onto the opposite side FIGS. 6a and 6b show a projection of a source volume to a projection surface, and inpainting of a sparse projection. A three-dimensional (3D) scene model, represented as objects OBJ1 comprising geometry primitives such as mesh elements, points, and/or voxel, may be projected onto one, or more, projection surfaces, as described earlier. As shown in FIG. 6a, these projection surface geometries may be "unfolded" onto 2D planes (two planes per projected source volume: one for texture TP1, one for depth GP1), which may then be encoded using standard 2D video compression technologies. Relevant projection geometry information may be transmitted alongside the encoded video files to the decoder. The decoder may then decode the video and performs the inverse projection to regenerate the 3D scene model object ROBJ1 in any desired representation format, which may be different from the starting format e.g. reconstructing a point cloud from original mesh model data.

In addition to the texture picture and geometry picture shown in FIG. 6a, one or more auxiliary pictures related to one or more said texture pictures and the pixels thereof may be encoded into or along the bitstream. The auxiliary pictures may e.g. represent texture surface properties related to one or more of the source volumes. Such texture surface properties may be e.g. surface normal information (e.g. with respect to the projection direction), reflectance and opacity (e.g. an alpha channel value).

An encoder may encode, in or along the bitstream, indication(s) of the type(s) of texture surface properties represented by the auxiliary pictures, and a decoder may decode, from or along the bitstream, indication(s) of the type(s) of texture surface properties represented by the auxiliary pictures.

Mechanisms to represent an auxiliary picture may include but are not limited to the following:
  A color component sample array, such as a chroma sample array, of the geometry picture.
  An additional sample array in addition to the conventional three color component sample arrays of the texture picture or the geometry picture.
  A constituent frame of a frame-packed picture that may also comprise texture picture(s) and/or geometry picture(s).
  An auxiliary picture included in specific data units in the bitstream. For example, the Advanced Video Coding (H.264/AVC) standard specifies a network abstraction layer (NAL) unit for a coded slice of an auxiliary coded picture without partitioning.
  An auxiliary picture layer within a layered bitstream. For example, the High Efficiency Video Coding (HEVC) standard comprises the feature of including auxiliary picture layers in the bitstream. An auxiliary picture layer comprises auxiliary pictures.
  An auxiliary picture bitstream separate from the bitstream(s) for the texture picture(s) and geometry picture(s). The auxiliary picture bitstream may be indicated, for example in a container file, to be associated with the bitstream(s) for the texture pictures(s) and geometry picture(s).

In some systems, the mechanism(s) to be used for auxiliary pictures may be pre-defined e.g. in a coding standard, while in other systems the mechanism(s) may be selected e.g. by an encoder and indicated in or along the bitstream. The decoder may decode the mechanism(s) used for auxiliary pictures from or along the bitstream.

The projection surface or surfaces of a source volume may encompass the source volume, and there may be a model of an object in that source volume. Encompassing may be understood so that the object (model) is inside the surface or the number of surfaces such that when looking from the center axis or center point of the surface, the object's points are closer to the center than the points of the projection surface are. Encompassing may also be understood so that when the object is rotated or the surface is rotated around the object, the different rotations capture different sides of the object such that essentially all aspects of the object can be covered. A projection surface or projection surfaces may also cover only one side of the object, and when multiple projections and decimations are carried out, different sides of the object may be covered. The model may be made of geometry primitives, as described.

The geometry primitives of the model may be projected onto the projection surface to obtain projected pixels of the texture picture. This projection may happen from inside-out. Alternatively or in addition, the projection may happen from outside-in.

Projecting 3D data onto 2D planes is independent from the 3D scene model representation format. There exist several approaches for projecting 3D data onto 2D planes, with the respective signalling. For example, there exist several mappings from spherical coordinates to planar coordinates, known from map projections of the globe, and the type and parameters of such projection may be signaled. For cylindrical projections, the aspect ratio of height and width may be signaled.

FIG. 6b illustrates inpainting, where sparsity in the original texture and depth projections (left) are reduced by inpainting or filtering (right). The 3D to 2D projections may cause sparse data OT1, IG1 in the projection pictures TP1, GP1, and such data is challenging to encode efficiently. The sparsity may be reduced by choosing appropriate geometry e.g. by rate distortion decision. The geometry choice affects the number of missing pixels and this may be used as a criterion for choosing the geometry. The remaining sparse values may be inpainted, that is, values may be created for such pixels by using values of the surrounding pixels through interpolation and/or filtering to obtain inpainted texture picture ITP1 and geometry picture IGP1. Such inpainted values IT1, IG1 would create new 3D points in the reconstruction, but these would lie on the object surface and thus they don't pose a problem. A specific depth value, e.g. 0, or a specific depth value range may be reserved to indicate that a pixel is inpainted and not present in the source material. The specific depth value or the specific depth value range may be pre-defined for example in a standard, or the specific depth value or the specific depth value range may be encoded into or along the bitstream and/or may be decoded from or along the bitstream. Additional 3D filtering may be applied to remove unnecessary points and to close surface holes due to points missing from the projection. For example, excess points co-locating in the same position in a quantized grid or close by in floating point values may be removed. Colour values of neighbouring points may be averaged. Points with no neighbor points may be removed. Inpainting is further described below.

Projection-based volumetric video compression may have a good compression efficiency compared to earlier approaches. However, it has been noticed here that the resulting projected 2D planes might not fully or not sufficiently cover the surface of an object to be projected. For example, concave parts of an object might become occluded in the projection, or occlusions may take place in the source volume due to a complex shape or several objects in the same projection, or inaccuracies may happen due to projecting three-dimensional geometry primitives on integer grid two-dimensional image planes. Such matters that have been noticed here may lead to an incomplete reconstruction of the decoded 3D object. For example, there may be holes in the object surface.

Sequential decimating projections as described in the following seek to improve projections especially from point cloud representations of 3D data. There exist several approaches for sequential decimating projections and related inpainting solutions, including a combination of any of the following.

FIGS. 7a, 7b and 7c illustrate a sequential decimating projection and the corresponding directions, as well as a non-orthogonal (oblique angle) projection. A three-dimensional (3D) object, represented as a dynamic point cloud, may be sequentially projected onto two-dimensional (2D) planes, for example similar to sides of polyhedron such as a cube (a four-sided polyhedron). The nearest points to the projection plane may be projected and then removed from the 3D object, that is, the object may be decimated after projection by removing the points that have been successfully projected. Then, the object may be rotated by X degrees around a predefined axis, where X is the size of the rotation step, and the previous steps may be repeated until enough points are projected. The stopping conditions may either be a number of rotations, a threshold number of projected pixels, or a threshold number of remaining 3D points in the object. The projection plane may not have to cover the complete object. That is, some points of the three-dimensional object may fall outside the projection surface, to be captured in another projection. An extreme case may be a one-pixel wide plane, only taking a single line of the object during each projection step, resulting in a sequential decimating cylinder projection.

In FIGS. 7a and 7b this process is shown for six planar projections. The projections 1-6 (DP1, DP2, DP3, DP4, DP5, DP6) of the texture data of the woman are placed in the texture picture side-by-side. Between each projection pair 1-2, 2-3, 3-4, 4-5 and 5-6, a decimation of the object data in the source volume is carried out. As can be seen in FIG. 7a, this leads to fewer DEC1 and fewer DEC2 pixels with projected data to be present in the projections compared to the original OR1, as the process continues. In the top view of FIG. 7b depicting the head HEAD, shoulders SHOU and nose NOSE of the woman corresponding to FIG. 7a, the projection directions 1-6 (DP1, DP2, DP3, DP4, DP5, DP6) to the corresponding projection surfaces S1, S2, S3, S4, S5, S6 are shown. The projection surfaces have been obtained by rotating the first projection surface with respect to the object. Alternatively, the projections may be obtained by rotating the model and projecting the model to the same projection surface. The projections can be carried out in any order, with constant rotation step in between, or with individual rotation steps between the projections. In the projection, texture pixels and geometry pixels are formed into the texture picture and geometry picture.

In the sequential projection method, the obtained texture pictures and geometry pictures may be coded into a bitstream. There may be several arrangements to construct texture and geometry pictures from projections and to code them into a bitstream including but not limited to the following. The examples are described with two projections but it needs to be understood that more than two projections could likewise be used.

A first layer of a bitstream may comprise a sequence of texture pictures. A texture picture may comprise, in a frame-packed manner, a first projection of first volumetric texture data of a source volume of the scene model (or an object) and a second projection of second volumetric texture data of the source volume. A second layer of the bitstream may comprise a sequence of geometry pictures. A geometry picture may comprise, in a frame-packed manner, the first projection of first geometry data, such as depth data, of the source volume and the second projection of second geometry data, such as depth data, of the source volume. Hence, a geometry picture may represent mappings of the first projection surface to the source volume and the second projection surface to the source volume, that is, the geometry picture may contain information to indicate the source position of the texture data in the texture picture.

First and second layers of a bitstream may comprise sequences of texture pictures. A texture picture of the first layer may comprise a first projection of first volumetric texture data of a source volume of the scene model (or an object). A texture picture of the second layer may comprise a second projection of second volumetric texture data of the source volume of the scene model (or an object). Third and fourth layers of the bitstream may comprise sequences of geometry pictures. A geometry picture of the third layer may comprise, the first projection of first geometry data, such as depth data, of the source volume. A geometry picture of the third layer may comprise the second projection of second geometry data, such as depth data, of the source volume.

The bitstream may comprise a single layer comprising a sequence of pictures. A picture may comprise, in a frame-packed manner,
 a first projection of first volumetric texture data of a source volume of the scene model (or an object),
 a second projection of second volumetric texture data of the source volume,
 the first projection of first geometry data, such as depth data, of the source volume, and
 the second projection of second geometry data, such as depth data, of the source volume.

The first projection may be done from the source volume to a first projection surface, and the second projection may be done from the source volume to a second projection surface. As described above, the second volumetric texture data may have been obtained by removing at least a part of the first volumetric texture data that has been successfully projected in the first projection.

Furthermore, projection geometry information of the first and the second projections may be encoded into or along the bitstream. The projection geometry information may comprise information of the position of the first and second projection surfaces in the scene model (or with respect to the object).

Generated by an encoder, the bitstream may comprise encoded or encapsulated one (or more) texture picture(s), one or more geometry pictures, plus one or more accompanying auxiliary pictures per texture picture. Each texture picture may represent several sides of a sequential 2D projection of 3D data onto a given projection surface geometry. Each geometry picture may represent respective geometry data, e.g. depth information for each pixel. The additional auxiliary pictures may represent respective further attributes, e.g. surface normal, reflectance, opacity, and so on. The relevant projection information may be indicated in or along the bitstream:
 projection geometry information: shape, size, location, orientation, number of projected sides,
 temporal changes in location, orientation and size the projection geometry, possibly as function of time,
 nature of auxiliary geometry data: bit depth, quantisation, value range, inverse values, and
 nature of other auxiliary data: Surface normal, opacity, reflectance, transmittance, refraction, etc.

The decoder may receive a bitstream comprising one (or more) coded or encapsulated texture picture(s), one or more geometry pictures, plus one or more coded accompanying auxiliary pictures per texture picture from a bitstream that has been generated by the encoder as discussed above. The decoder may decode the texture picture(s), geometry picture(s) and possibly any auxiliary pictures. The decoder may then reconstruct the 3D object sequentially, projection-after-projection, from the received texture and geometry information. The decoder may verify the pixels to check whether the 3D projection of a 2D pixel is a valid part of the 3D object. The 3D scene model or object may thus be reconstructed from one or more input pictures, and subsequently rendered to a user for viewing.

In the above, a further projection surface may be the same as an earlier projection surface after rotating the source volume and the earlier projection surface with respect to each other by an amount of a rotation step, and the rotation step may be coded into the bitstream.

In general, rotation may be understood as any selection of projection geometry information. Specifically, a rotation axis needs not coincide with the projection center axis. In other words, the relative orientation of the projection surface and the source volume (object) being projected may be altered between two projections.

As described above, the texture and geometry pictures may contain one or more projections, that is, the different projections may be coded in the same or different pictures. The texture picture may thus comprise a plurality of projections of texture data from the source volume and the geometry picture may represent a plurality of mappings of projection surfaces to the source volume.

Inter-layer prediction may be used between layers of the bitstream. For example, one or more motion vectors of a geometry picture may be predicted from the motion vectors of a respective texture picture. This may be done by selecting the texture picture to be the source picture for motion vector prediction e.g. in temporal motion vector prediction (TMVP) of the High Efficiency Video Coding (HEVC) standard.

Layers may have but need not have the same spatial resolution with each other. For example, a first layer for the second projection may have a different resolution than a second layer for the first projection. In another example, a first layer comprising texture pictures may have a different resolution than a second layer comprising geometry pictures. Inter-layer prediction for spatial scalability may but need not be used between such layers.

Inter-projection prediction may be defined as one type of inter-layer prediction and may be used by an encoder and/or a decoder. That is, frames from one projection (texture and geometry images) may be used as a source for predicting the frames of another projection. This prediction may happen so that the reference frames are from the same time instance than the frames to be predicted. In the prediction process, the reconstructed point cloud of the reconstructed texture and geometry images is projected onto a second projection surface and the respective texture and geometry prediction pictures are formed from this projection. The encoder and decoder may include the formed prediction picture(s) into a reference picture list and may use the prediction picture(s) as a reference for prediction similarly to conventional temporal reference pictures, as described earlier. It is remarked that more than one projection may likewise be used as a source for inter-layer prediction. That is, a point cloud may be reconstructed from several reconstructed texture and geometry images, and this point cloud can be projected onto the second projection surface.

Multiple objects may be coded into a bitstream, where each object is arranged as one or more layers in the bitstream as described above, and a single layer comprises information about one object only. Alternatively, a frame-packed representation of texture and/or geometry pictures of different objects may be formed and coded.

For each object, additional information may be signalled to allow for reconstruction at the decoder side:

- in the case of a frame-packed representation: separation boundaries may be signaled to recreate the individual planes for each object,
- in the case of projection-based compression of static content: classification of each object as static/dynamic may be signaled,
- relevant data to create real-world geometry data from the decoded (quantised) geometry channel(s), e.g. quantisation method, depth ranges, bit depth, etc. may be signaled,
- initial state of each object: geometry shape, location, orientation, size may be signaled,
- sequential decimating projection information may be signalled: the number of rotations, rotation steps, rotation axis, axis scaling,
- temporal changes for each object, either as changes to the initial state on a per-picture level, or as a function of time may be signaled, and
- nature of any additional auxiliary data may be signaled.

For the described example, signaling may be as follows:

```
NUM_OBJECTS       1
FRAME_PACKED      0           // individual inputs
for i=0:NUM_OBJECTS           // initial states for each projection geometry
  OBJ_CENTER_X/Y/Z            // object position in 3D space
  OBJ_SIZE_ X/Y/Z             // object dimensions in 3D space
  OBJ_ROTATION_X/Y/Z          // object orientation in 3D space
  PROJ_DIMENSION_X/Y          // dimension of individual projection
  PROJ_SCALING_X/Y            // projection scaling
  PROJ_STEPS                  // projection steps
  PROJ_ROTATION               // projection step rotation
  DEPTH_QUANT                 // depth quantisation, i.e. 0 for linear, ...
  DEPTH_MIN                   // minimum depth in 3D space units
  DEPTH_MAX                   // maximum depth in 3D space units
end
for n=0:NUM_FRAMES
  for i=0:NUM_OBJECTS
    CHANGE         1          // i.e. 0=static, 1=translation,
                              2=trans+rotation, ...
    TRANS_VEC                 // translation vector
    ...                       // relevant data to represent change
  end
end
```

The decoder may receive the video bitstream representing the 3D object/scene model. Based on the signaled information on the projection geometries, each object may be reconstructed in 3D space and the decoded scene model is created by fusing all reconstructed parts (objects or source volumes) together. The projection order of the different surfaces e.g. faces of a polyhedron is not necessarily fixed and could be signaled. Neither do all the projection steps have to be of the same value. An alternative signaling for the projections may be as follows:

```
for i=0:NUM_OBJECTS          // initial states for each projection
                             geometry
...
  NUM_ROT                    // number of projection rotations
  for i=0:NUM_PROJECTIONS
    PROJ_ROTATION_X/Y/Z      // projection step rotation
  end
...
end
```

A second projection surface may be located opposite to or essentially opposite to the first projection surface with respect to said first source volume. Thus, the successive projection "shots" may be taken e.g. from the front and the back of an object.

The initial volumetric texture data may be decimated to obtain second volumetric texture data by removing (at least a part of) the initial volumetric texture data that has been successfully projected in a projection. That is, once a point in a point cloud has been projected in a projection and the point has a corresponding texture pixel and a geometry pixel in the texture picture and geometry picture, respectively, the point may be removed from the point cloud. Such removal may happen during the projection process of forming the pixels, or it may happen in a separate phase.

The decimation of the object (volumetric texture data) may take place after each projection. Alternatively, a texture picture may further comprise one or more complementing projection(s) of the same volumetric texture data of the same source volume of a scene model, where the complementing projection is from the same source volume to a complementing projection surface such that the volumetric texture data of the object (source volume) is not decimated between the first and the complementing projection. The first volumetric texture data may be decimated after the complementing projection(s) to obtain another set of volumetric texture data by removing at least a part of the first volumetric texture data that has been successfully projected in either one or both of the first projection and the complementing projection. For example, a front and back projections may be carried out such that the second projection is the complementing projection after which the decimation is carried out.

As another example, a full 360 degrees projection with 4 projections (e.g. to planes) may be carried out with 90 degree rotation in between, and then the object may be decimate. Further projections may be carried out after that, for example another full 360 projection in four steps, and decimation either in between the steps or only after all four steps.

A texture picture and a geometry picture may comprise two similar projections of an object such that the object and the projection surface are not rotated with respect to each other, but a decimation of the object takes place in between.

The described approach may offer advantages. For example, the appearance of holes in the reconstructed 3D object due to occlusions and mapping errors in the 3D→2D projection may be reduced. The benefits of projection-based projection may maintained, as projecting volumetric models onto 2D planes allows for using standard 2D video coding tools with efficient spatial and temporal video compression. Using projections of individual objects or their parts instead of prior-art 2D-video based approaches, i.e. multiview+depth, may provide a better coverage of the scene model and/or the object. Thus, 6DOF viewing capabilities of the reconstructed scene model may be improved. Standard video encoding hardware may be utilised for real-time compression/decompression of the projected planes. The projection and reverse projection steps may be of low complexity. Table 1 below shows a comparison of required bitrates of sequential decimation projection, projection coding without decimation and current technology of coding volumetric video, according to various metrics (columns).

TABLE 1

Reduction in required bitrates (Bjontegaard delta bitrates) for sequential decimation

|  | Point-to-point distortion | Point-to-plane distortion | Colour distortion (YUY) |
|---|---|---|---|
| Projection-based vs. current technology | −85.7% | −76.4 | −52.8% |
| Projection-based with sequential decimation vs. current technology | −86.0% | −76.6% | −52.9% |
| Projection-based with sequential decimation vs. Projection-based without sequential decimation | −10.8% | −14.4% | −0.9% |

Performance tests have shown improvements in coding efficiency compared to projections without decimation. Tab. I illustrates the decrease in required bitrate, following the measurement procedure laid out in the ISO/IEC JTC1/SC29/WG11 (MPEG) Call for Proposals for Point Cloud Compression V2 [ISO/IEC JTC1/SC29/WG11 MPEG2017/N16763]. Required bit rates could be reduced by 86% with respect to point-to-point geometry distortion, 77% with respect to point-to-plane geometry distortion and 53% with respect to YUV colour distortion, when compared to current state-of-the-art volumetric video coding technology. Required bit rates could be reduced by 11% with respect to point-to-point geometry distortion, 14% with respect to point-to-plane geometry distortion and 1% with respect to YUV colour distortion, when compared to projection-based volumetric video compression without sequential decimation.

FIG. 7c illustrates the use of an oblique angle projection with respect to the coordinate grid resulting from quantization of the point coordinates. That is, the first volumetric texture data may be aligned to a coordinate grid having orthogonal axes, and the projection may be done in a projection direction that is oblique with respect to one or more of said axes. This may be done for the first projection of the sequence or any later projection. Using an oblique projection for the first projection may allow to avoid obstruction of points behind their neighbors that is due to the quantization.

3D point cloud data may be represented on a 3D integer grid with fixed precision, e.g. 10-bit precision. As such data represents real world objects, the quantization of a surface onto a fixed grid may create quantization inaccuracies. Such inaccuracies could lead to several points on the same axis position, that is, behind each other. FIG. 7c illustrates the top view of such a mapping, where the curved line represents a surface of an object to be projected and the dark points POK and light points PHID indicate points in the point cloud. Projecting such a fixed grid point cloud onto a front-facing plane S3 would only result in the dark points POK to be represented in the projection (non-shifted projection, black line). The grey points would remain for a later projection.

As shown in FIG. 7c, a 3D object, represented as a dynamic point cloud, may be rotated by 45 degrees, before proceeding with the sequential decimating projection. The precision (=resolution) of the projection plane is increased to reflect the increased number possibly projected points, i.e. increase width by a factor of sqrt(2) in the case of the oblique angle being 45 degrees with respect to the quantization axes.

Due to this approach, possibly hidden points (light) PHID are already projected in an early projection step to projection surface S1. More points may thus be covered per projection. The oblique angle may be 45 degrees, preferably between 30 to 60 degrees such that the hidden points PHID become sufficiently visible, or any other angle.

For the described example, additional signalling may include:

```
for i=0:NUM_OBJECTS    // initial states for each projection geometry
...
INIT_ROTATION 1        // initial rotation: 0=off, 1=45 degrees
...
end
```

In optimizing the starting projection, the principal axis (longest axis) of the model may be estimated. The initial rotation may be determined by rate distortion criteria.

The decoder may receive the video bitstream representing the 3D object. Based on the signalled information on the projection geometry, the object is reconstructed in 3D space. A full decoded scene model is created by fusing several objects together.

Using the oblique angle projection, as more points are covered per rotation step, either less rotations may be required or a higher reconstruction quality may be achieved with the same number of rotations. Table 2 below shows a comparison of required bitrates of oblique angle sequential decimation projection, straight projection sequential decimation coding and current technology of coding volumetric video, according to various metrics (columns).

TABLE 2

Reduction in required bitrates (Bjontegaard delta bitrates) for oblique angle initial rotation

|  | Point-to-point distortion | Point-to-plane distortion | Colour distortion (YUY) |
|---|---|---|---|
| Straight projection vs. current technology | −86.0% | −76.6% | −52.9% |
| Oblique angle vs. current technology | −86.4% | −78.0% | −53.6% |
| Oblique angle vs. straight projection | −45.4% | −20.0% | −25.2 |

Performance tests have shown improvements in coding efficiency compared to projections without oblique angle. Table 2 illustrates the decrease in required bitrate, following the measurement procedure laid out in the ISO/IEC JTC1/SC29/WG11 (MPEG) Call for Proposals for Point Cloud Compression V2 [ISO/IEC JTC1/SC29/WG11 MPEG2017/N16763]. Required bit rates could be reduced by 86% with respect to point-to-point geometry distortion, 78% with respect to point-to-plane geometry distortion and 54% with respect to YUV colour distortion, when compared to current state-of-the-art volumetric video coding technology. Required bit rates could be reduced by 45% with respect to point-to-point geometry distortion, 20% with respect to point-to-plane geometry distortion and 25% with respect to YUV colour distortion, when compared to projection-based volumetric video compression without intitial rotation.

A texture picture may comprise one, two, three, four or any number projections of volumetric texture data of the source volume of a scene model. The projecting and decimating volumetric texture data may be repeated for a number of iterations until a stopping condition is reached, thereby producing the number of projections. The number of iterations (i.e., the number of projections) may be coded into or along the bitstream. The angles between the projections may be equal to each other, thereby causing a sequence projections with a constant rotation step. The constant rotation step may be coded into or along the bitstream. The property that the rotation step is constant may be coded into the bitstream. The number of rotation steps may be coded into the bitstream. The angles between the projections may also be unequal, and the angles between projections may be coded into or along the bitstream. There may be one or more stopping conditions in determining the number of iterations. For example, the iterations may be stopped when the pre-defined projections of the projection geometry have been completed. Alternatively or in addition, the number or proportion of points left in the object or the number or proportion of projection pixels created may be used as criteria. Alternatively or in addition, when the model is empty enough or the projection produces sparse enough result, the iteration may be stopped.

Figure 8A:
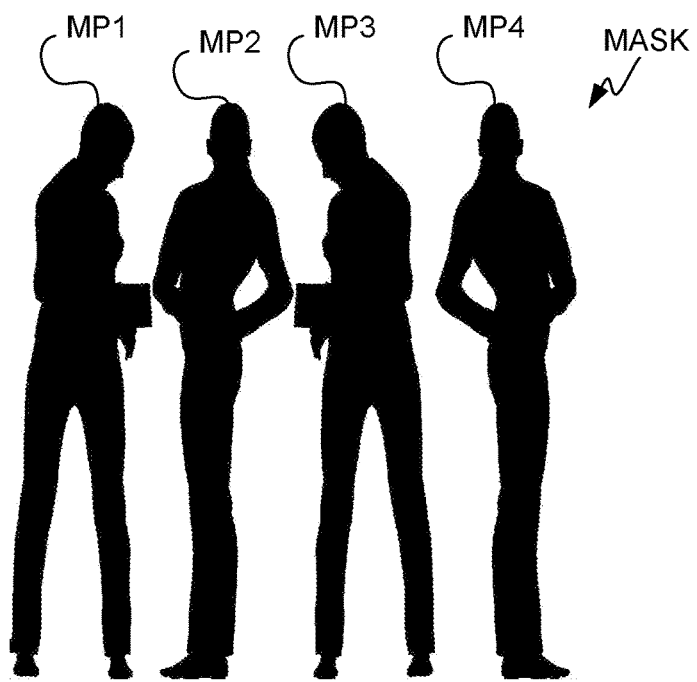
FIGS. 8a, 8b and 8c show a mask for a sequential projection, and a corresponding inpainted texture picture and an inpainted geometry (depth) picture.
Figure 8B:
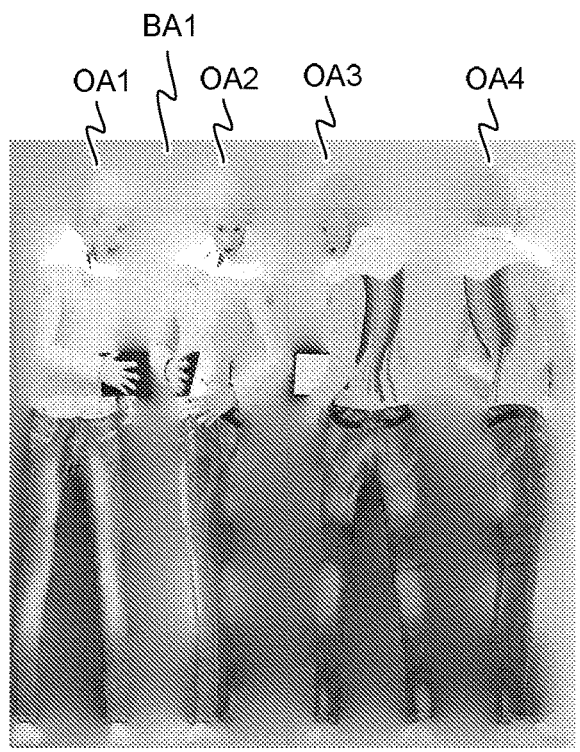
Figure 8C:
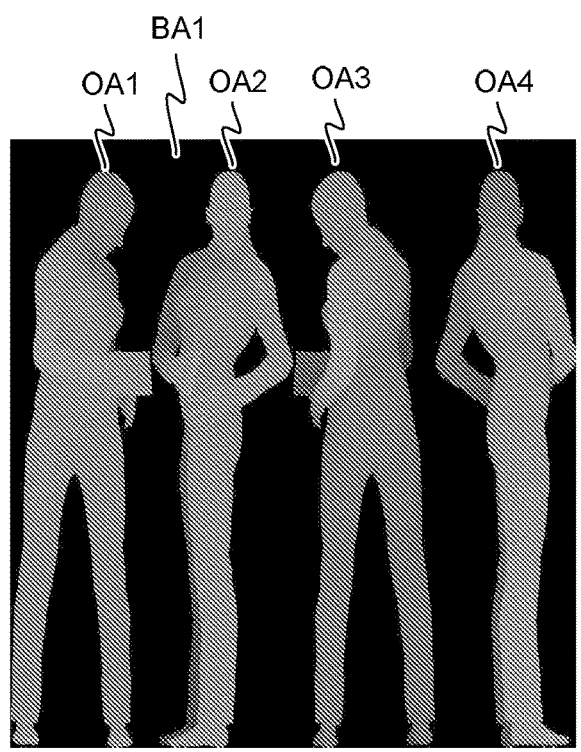

FIGS. 8a, 8b and 8c show a mask for a sequential projection, and a corresponding inpainted texture picture and an inpainted geometry (depth) picture.

The sequential decimation process increases sparsity in the projected 2D data after each decimation step. It has been noticed here that this sparsity increase decreases coding efficiency. Inpainting techniques may be used to reduce sparsity and improve coding efficiency. However, it has further been noticed here that inpainted projection pictures would create new (false) points in the reconstructed 3D object.

As shown in FIG. 8a, to address this matter, original, un-decimated, 3D data of the object may be used to generate a mask MASK for inpainting such sparsity only within the boundaries of the 3D object. Each mask MP1, MP2, MP3, MP4 may correspond to the projections that form the texture and geometry pictures. Such a mask of the first and second and further projections may be encoded into the bitstream, wherein the mask is indicative of pixels of the first texture picture that represent said first or second volumetric texture data.

FIG. 8b illustrates this approach, where an inpainting mask is used to reduce the inpainting process only to the projected object areas OA1, OA2, OA3, OA4. For the texture plane, areas BA1 outside the inpainting mask may be filled by interpolation. Mechanisms to represent the inpainting mask may include but are not limited to the following:

In the depth plane, inpainted areas, such as BA1, may be set to a certain code value, e.g. "0", or any other predefined threshold value, or any value within one or more predefined or indicated value ranges, to indicate the decoder that these points should not be reconstructed.

The inpainting mask may be coded as a color component sample array, such as a chroma sample array, of the geometry picture.

The inpainting mask may be an additional sample array in addition to the conventional three color component sample arrays of the texture picture or the geometry picture.

The inpainting mask may be a constituent frame of a frame-packed picture that may also comprise texture picture(s) and/or geometry picture(s).

The inpainting mask may be an auxiliary picture included in specific data units in the bitstream. For example, the Advanced Video Coding (H.264/AVC) standard specifies a network abstraction layer (NAL) unit for a coded slice of an auxiliary coded picture without partitioning.

The sequence of inpainting masks may be coded as a layer within a layered bitstream. For example, an auxiliary picture layer may be used.

The construction of the texture and geometry pictures with inpainting as described above may make them more efficient to encode, while the data for re-creating the 3D object/scene model remains the same. Inpainting may remove sharp borders, points etc. high frequencies from the pictures and thereby improve coding efficiency more than leaving out the non-existing parts from the images.

Inpainting may also be applied within the object boundaries, however instead of using interpolation, any empty pixel within the object boundaries may be filled with its respective point in the full, un-decimated, point cloud. If no corresponding 3D point exists for a certain pixel position, standard interpolation can be applied. Different inpainting methods such as linear interpolation, bicubic interpolation, padding (repeat), low-pass filtering, median filtering, texture copy, mean Gaussian filtering (blurring) and other filters may be used.

In other words, such pixels of a texture picture that do not represent volumetric texture data may be inpainted by using values of pixels of the texture picture that do represent volumetric texture data.

Since the inpainted pixels do not affect the reconstructed source volumes, an encoder may adjust its encoding process to omit the distortion (e.g. mean square error or absolute difference) caused by inpainted pixels from the mode selection process. In other words, when determining a distortion caused by certain coding mode, the inpainted pixels may be omitted.

As shown in FIG. 8c, such pixels of a geometry picture that do not correspond to volumetric texture data may be inpainted by using values of pixels of the geometry picture that do correspond to volumetric texture data or a special value indicating that the pixels do not correspond to volumetric texture data.

To avoid falsely reconstructed points, the inpainting approach may be adapted, to:

a) Provide information at the encoder, e.g. a mask, describing the object boundaries in projection-domain to restrict inpainting, b) Provide information at the decoder side to predict which points are inpainted and how to omit these in the reconstruction.

The geometry (depth) picture may have inpainted areas and no-data areas. In this manner thereby, the mask may be transmitted in the geometry picture, and may not need to be transmitted separately.

At the decoder side, the reconstruction process may first check whether a pixel should be reconstructed, e.g. whether the pixel has a depth value other than "0" or another mask value, and if so, if there is already a reconstructed point at similar coordinates and with similar texture value (e.g. an inpainted point). Thresholds defining the maximum error in geometry and colour value to still be considered "similar" may either be predefined or signalled in the bitstream. Such thresholds may be given in metric or grid coordinate steps for geometry, or for example as colour difference value, e.g. CIELab2000 distance or absolute difference in colour code values.

For the described example, additional signalling would include:

```
for i=0:NUM_OBJECTS        // initial states for each projection geometry
...
FULL_INTERPOLATION 1       // interpolate using full point cloud 0: off,
                           //   1:on
INVALID_DEPTH 0            // depth code value for invalid points
MAX_GEO_ERROR              // search range around 3D location for
                           //   "similar" points
MAX_COL_ERROR              // Colour difference to establish similarity
                           //   of points within
MAX_GEO_ERROR,             // e.g using CIELab2000 difference
...
end
```

The inpainting and mask approach may reduce artefacts introduced by reconstructing invalid points due to inpainting of the texture and geometry pictures. Furthermore, due to only reconstructing unique 3D points, the reconstructed point clouds may end up having only relevant points, and the requirements on the visualisation renderer may relaxed.

The layers of a bitstream that are transmitted may be selected adaptively. The adaptive selection may be based for example on adjusting the transmitted bitrate according to an estimated throughput of the network and/or an access link. Alternatively or additionally, the adaptive selection may be based on selecting the number of layers according to the decoding capacity. Alternatively or additionally, the adaptive selection may be based on viewing position and viewing orientation within the 3D. For example, only layers that represent geometry primitives that are visible in the current viewing position and viewing orientation may be selected to be transmitted, while the other layers may be omitted. If inter-layer prediction has been applied, the reference layers for inter-layer prediction may additionally need to be transmitted. Moreover, to account for viewing position or viewing orientation changes, layers that represent geometry primitives that would be visible if viewing position and/or orientation changes within certain ranges are transmitted. In some systems, the selection of transmitted layers may take place in the client (e.g. a viewing device). In some other systems, the client may inform the present viewing position and/or orientation to a server, and the selection of transmitted layers may take place in the server.

A coding tree block (CTB) may be defined as an N×N block of samples. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples.

In some coding systems, a picture can be partitioned in tiles, which are rectangular and contain an integer number of coding tree units (CTUs). The partitioning to tiles may form a grid that may be characterized by a list of tile column widths (in CTUs) and a list of tile row heights (in CTUs). Tiles may be ordered in the bitstream consecutively in the raster scan order of the tile grid.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction (TMVP) of HEVC, or by disallowing the encoder to use the TMVP candidate or any motion vector prediction candidate following the TMVP candidate in the motion vector candidate list for such blocks that select the TMVP candidate from outside the MCTS boundary.

Note that sample locations used in inter prediction may be saturated so that a location that would be outside the picture otherwise is saturated to point to the corresponding boundary sample of the picture. Hence, if a tile boundary is also a picture boundary, motion vectors may effectively cross that boundary or a motion vector may effectively cause fractional sample interpolation that would refer to a location outside that boundary, since the sample locations are saturated onto the boundary.

The temporal motion-constrained tile sets SEI message of HEVC can be used to indicate the presence of motion-constrained tile sets in the bitstream.

Some description in the following is with reference to frame packing, where a constituent picture may be encoded as a MCTS. A decoder may determine which MCTSs are reconstructed. For example, when computational resources are not sufficient for decoding the texture and/or geometry pictures entirely, a subset of the projections and the respective constituent pictures within the texture and/or geometry pictures may be selected and decoded, while omitting the decoding process for the other MCTSs.

Figure 9A:
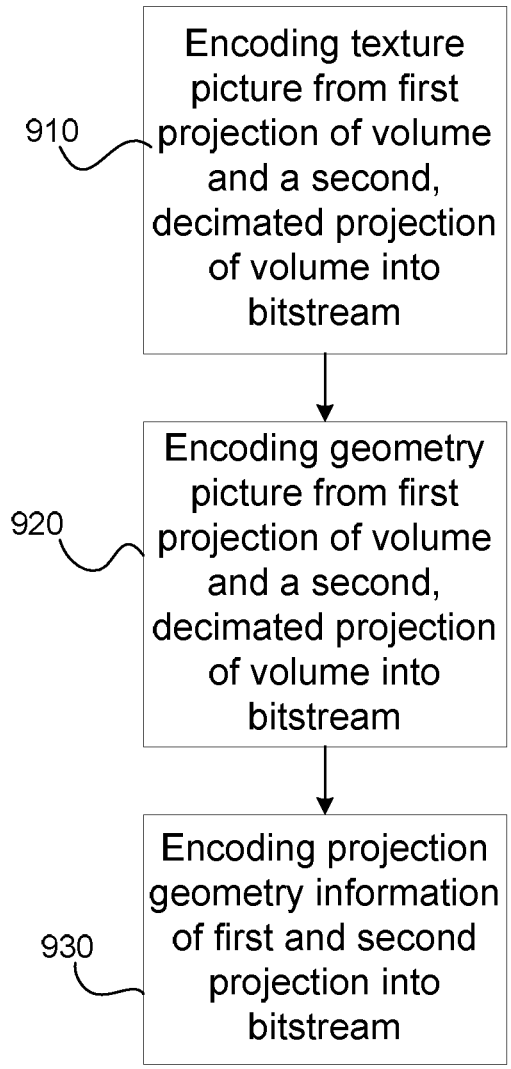
FIGS. 9a and 9b show flow charts for encoding and decoding of a three-dimensional scene.
Figure 9B:
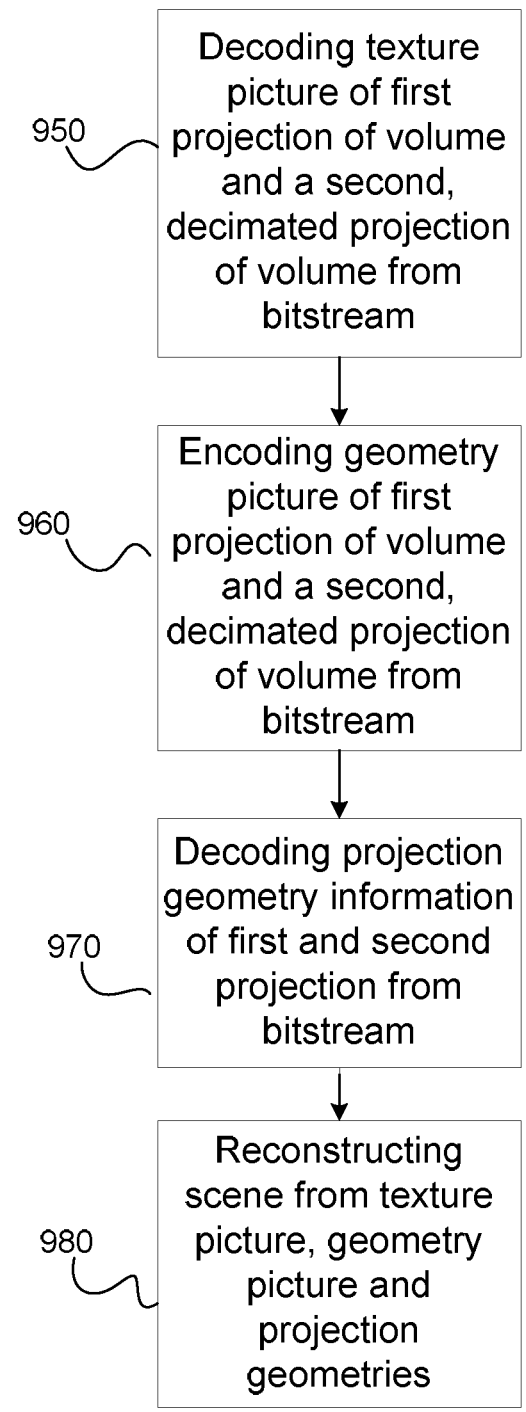

FIGS. 9a and 9b show flow charts for encoding and decoding of a three-dimensional scene model.

As shown in FIG. 9a, in encoding, at phase 910, a texture picture may be encoded into a bitstream. As described earlier, the texture picture may comprise a first projection of first volumetric texture data of a source volume of a scene model and a second projection of second volumetric texture data of the source volume of the scene model, the first projection being from the source volume to a first projection surface, and the second projection being from the source volume to a second projection surface. As described earlier, the second volumetric texture data for the second projection may have been obtained by removing at least a part of the first volumetric texture data that has been successfully projected in the first projection. This removing of projected data may be called decimation.

At phase 920, a geometry picture may be encoded into said bitstream, said geometry picture representing a mapping of the first projection surface to the source volume and a mapping of the second projection surface to the source volume. That is, the geometry picture may comprise data for determining where the texture picture's texture data originates in the source volume.

At phase 930, projection geometry information of the first and second projections may be encoded into the bitstream. The projection geometry information may comprise information of the position of the first and second projection surfaces in the scene model.

As shown in FIG. 9b, in decoding, at phase 950, a texture picture may be decoded from a bitstream to obtain first and second decoded texture data of a source volume. As described earlier, the second volumetric texture data for the second projection may have been obtained by removing at least a part of the first volumetric texture data that has been successfully projected in the first projection. As described earlier, the second volumetric texture data for the second projection may have been obtained by decimation of the first volumetric texture data by removing at least a part of the first volumetric texture data that has been successfully projected in the first projection.

At phase 960 a geometry picture may be decoded from the bitstream to obtain first and second decoded geometry data of a source volume, the geometry picture representing a mapping of the first projection surface to said source volume and a mapping of the second projection surface to said source volume.

At phase 970, projection geometry information of said first and second projections may be decoded from the bitstream, the projection geometry information comprising information of position of the first and second projection surfaces in the scene model.

At phase 980, a reconstructed scene model may be computed by projecting the first decoded texture data to a destination volume using the first decoded geometry data and the first projection geometry information and by projecting the second decoded texture data to the destination volume using the second decoded geometry data and the projection geometry information.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is clear that the present invention is not limited solely to the above-presented embodiments, but it can be modified within the scope of the appended claims.

The invention claimed is:

1. A method, comprising:
 encoding a first texture picture into a bitstream, said first texture picture comprising a first projection of first volumetric texture data of a first source volume of a scene model and a second projection of second volumetric texture data of said first source volume of said scene model, said first projection being from said first source volume to a first projection surface, and said second projection being from said first source volume to a second projection surface, wherein a first point of the first source volume corresponds to both a position of a point of the first projection and a position of a point of the second projection, wherein the first projection surface is farther from the first point of the first source volume than the second projection surface;
 encoding a first geometry picture into said bitstream, said first geometry picture comprising at least:
  mapping of said first projection surface to said first source volume,
  mapping of said second projection surface to said first source volume,
  a first depth, from the first projection surface to the first source volume, for a first point of the first projection, and
  a second depth, from the second projection surface to the first source volume, for a second point of the second projection; and
 encoding a projection geometry information of said first and second projections into said bitstream, said projection geometry information comprising information of a position of said first and second projection surfaces in said scene model.

2. A method according to claim 1, wherein said second projection surface is same as said first projection surface after rotating said first source volume and said first projection surface with respect to each other by an amount of a first rotation step, and said method further comprising:
 encoding said first rotation step into said bitstream.

3. A method according to claim 1, wherein said second projection surface is located opposite to or substantially opposite to said first projection surface with respect to said first source volume.

4. A method according to claim 1, said second volumetric texture data being obtained by removing at least a part of said first volumetric texture data that has been projected in said first projection, further comprising:
 decimating said first volumetric texture data to obtain said second volumetric texture data by removing at least the part of said first volumetric texture data that has been projected in said first projection.

5. A method according to claim 4, wherein said first texture picture further comprising a complementing projection of said first volumetric texture data of said first source volume of said scene model, said complementing projection being from said first source volume to a complementing projection surface, said method further comprising:
 decimating said first volumetric texture data after said complementing projection to obtain said second volumetric texture data by removing at least a part of said first volumetric texture data that has been projected in at least one of said first projection or said complementing projection.

6. A method according to claim 1, wherein said first volumetric texture data is aligned to a coordinate grid comprising orthogonal axes, and said first projection has a projection direction that is oblique with respect to one or more of said orthogonal axes.

7. A method according to claim 1, wherein said first texture picture further comprising further projections of volumetric texture data of said first source volume of said scene model, and said method further comprising:
 repeating projecting and decimating volumetric texture data for a number of iterations until a stopping condition is reached; and
 encoding said number of iterations into said bitstream.

8. A method according to claim 1, further comprising:
 encoding a mask of said first and second projections into said bitstream, wherein said mask is indicative of pixels of the first texture picture that represent said first or second volumetric texture data.

9. A method according to claim 1, further comprising:
 inpainting pixels of said first texture picture that do not represent said first or second volumetric texture data by using values of pixels of said first texture picture that do represent said first or second volumetric texture data.

10. A method according to claim 1, further comprising:
 inpainting pixels of said first geometry picture that do not correspond to said first or second volumetric texture data by using values of pixels of said first geometry picture that do correspond to said first or second volumetric texture data or a special value indicating that the pixels do not correspond to volumetric texture data.

11. A method, comprising:
 decoding a first texture picture from a bitstream to obtain first and second decoded texture data of a first source volume of a scene model, said first decoded texture data comprising a first projection of first volumetric texture data of said first source volume of said scene model, said second decoded texture data comprising a second projection of second volumetric texture data of said first source volume of said scene model, said first projection being from said first source volume to a first projection surface, and said second projection being from said first source volume to a second projection surface, wherein a first point of the first source volume corresponds to both a position of a point of the first decoded texture data and a position of a point of the second decoded texture data, wherein the first projection surface is farther from the first point of the first source volume than the second projection surface;

decoding a first geometry picture from said bitstream to obtain first and second decoded geometry data of said first source volume, said first decoded geometry data comprising mapping of said first projection surface to said first source volume and a first depth, from the first projection surface to the first source volume, for a first point of the first projection, said second decoded geometry data comprising mapping of said second projection surface to said first source volume and a second depth, from the second projection surface to the first source volume, for a second point of the second projection;

decoding projection geometry information of said first and second projections from said bitstream, said projection geometry information comprising information of position of said first and second projection surfaces in said scene model; and forming a reconstructed scene model by projecting said first decoded texture data to a first destination volume using said first decoded geometry data and said projection geometry information, and by projecting said second decoded texture data to said first destination volume using said second decoded geometry data and said projection geometry information.

12. A method according to claim 11, wherein said second projection surface is the same or essentially same as said first projection surface after rotating said first source volume and said first projection surface with respect to each other by an amount of a first rotation step, and said method further comprising:

decoding said first rotation step from said bitstream; and
projecting said second decoded texture data to said first destination volume after rotating said first projection surface with respect to said first destination volume according to said first rotation step to obtain said second projection surface.

13. A method according to claim 11, further comprising:
decoding a mask of said first and second projections from said bitstream, wherein said mask is indicative of pixels of the first texture picture that represent said first or second volumetric texture data; and
omit reconstruction of said scene model from pixels of said first texture picture that are indicated by said mask not to represent said first or second volumetric texture data.

14. An apparatus comprising:
at least one processor; and
at least one non-transitory memory including computer program code;
the at least one memory and the computer program code configured to, with the at least one processor, cause the apparatus at least to perform:

encode a first texture picture into a bitstream, said first texture picture comprising a first projection of first volumetric texture data of a first source volume of a scene model and a second projection of second volumetric texture data of said first source volume of said scene model, said first projection being from said first source volume to a first projection surface, and said second projection being from said first source volume to a second projection surface, wherein a first point of the first source volume corresponds to both a position of a point of the first projection and a position of a point of the second projection, wherein the first projection surface is farther from the first point of the first source volume than the second projection surface;

encode a first geometry picture into said bitstream, said first geometry picture comprising at least:
mapping of said first projection surface to said first source volume,
mapping of said second projection surface to said first source volume,
a first depth, from the first projection surface to the first source volume, for a first point of the first projection, and
a second depth, from the second projection surface to the first source volume, for a second point of the second projection; and encode a projection geometry information of said first and second projections into said bitstream, said projection geometry information comprising information of a position of said first and second projection surfaces in said scene model.

15. An apparatus according to claim 14, wherein said second projection surface is same as said first projection surface after rotating said first source volume and said first projection surface with respect to each other by an amount of a first rotation step, and said apparatus further caused to:
encode said first rotation step into said bitstream.

16. An apparatus according to claim 14, wherein said second projection surface is located opposite to or substantially opposite to said first projection surface with respect to said first source volume.

17. An apparatus according to claim 14, said second volumetric texture data being obtained by removing at least a part of said first volumetric texture data that has been projected in said first projection, wherein the apparatus is further caused to:
decimate said first volumetric texture data to obtain said second volumetric texture data by removing at least the part of said first volumetric texture data that has been projected in said first projection.

18. An apparatus comprising:
at least one processor; and
at least one non-transitory memory including computer program code;
the at least one memory and the computer program code configured to, with the at least one processor, cause the apparatus at least to perform:
decode a first texture picture from a bitstream to obtain first and second decoded texture data of a first source volume of a scene model, said first decoded texture data comprising a first projection of first volumetric texture data of said first source volume of said scene model, said second decoded texture data comprising a second projection of second volumetric texture data of said first source volume of said scene model, said first projection being from said first source volume to a first projection surface, and said second projection being from said first source volume to a second projection surface, wherein a first point of the first source volume corresponds to both a position of a point of the first decoded texture data and a position of a point of the second decoded texture data, wherein the first projection surface is farther from the first point of the first source volume than the second projection surface;

decode a first geometry picture from said bitstream to obtain first and second decoded geometry data of said first source volume, said first decoded geometry data comprising mapping of said first projection surface to said first source volume and a first depth, from the first projection surface to the first source volume, for a first point of the first projection, said second decoded geometry data comprising mapping of said second projection surface to said first source volume and a second depth, from the second projection surface to the first source volume, for a second point of the second projection;

decode projection geometry information of said first and second projections from said bitstream, said projection geometry information comprising information of position of said first and second projection surfaces in said scene model; and form a reconstructed scene model by projecting said first decoded texture data to a first destination volume using said first decoded geometry data and said projection geometry information, and by projecting said second decoded texture data to said first destination volume using said second decoded geometry data and said projection geometry information.

19. A system comprising at least one processor, non-transitory memory including computer program code, the memory and the computer program code configured to, with the at least one processor, cause the system to perform at least the following:

encode a first texture picture into a bitstream, said first texture picture comprising a first projection of first volumetric texture data of a first source volume of a scene model and a second projection of second volumetric texture data of said first source volume of said scene model, said first projection being from said first source volume to a first projection surface, and said second projection being from said first source volume to a second projection surface, wherein a first point of the first source volume corresponds to both a position of a point of the first projection and a position of a point of the second projection, wherein the first projection surface is farther from the first point of the first source volume than the second projection surface;

encode a first geometry picture into said bitstream, said first geometry picture comprising at least:
  mapping of said first projection surface to said first source volume,
  mapping of said second projection surface to said first source volume,
  a first depth, from the first projection surface to the first source volume, for a first point of the first projection, and
  a second depth, from the second projection surface to the first source volume, for a second point of the second projection;

encode a projection geometry information of said first and second projections into said bitstream, said projection geometry information comprising information of a position of said first and second projection surfaces in said scene model;

decode said first texture picture from said bitstream to obtain first and second decoded texture data of said first source volume;

decode said first geometry picture from said bitstream to obtain first and second decoded geometry data of said first source volume;

decode said projection geometry information of said first and second projections from said bitstream; and form a reconstructed scene model by projecting said first decoded texture data to a first destination volume using said first decoded geometry data and said projection geometry information and by projecting said second decoded texture data to said first destination volume using said second decoded geometry data and said projection geometry information.

20. A system comprising at least one processor, non-transitory memory including computer program code, the memory and the computer program code configured to, with the at least one processor, cause the system to perform at least the following:

decode a first texture picture from a bitstream to obtain first and second decoded texture data of a first source volume of a scene model, said first decoded texture data comprising a first projection of first volumetric texture data of said first source volume of said scene model, said second decoded texture data comprising a second projection of second volumetric texture data of said first source volume of said scene model, said first projection being from said first source volume to a first projection surface, and said second projection being from said first source volume to a second projection surface, wherein a first point of the first source volume corresponds to both a position of a point of the first decoded texture data and a position of a point of the second decoded texture data, wherein the first projection surface is farther from the first point of the first source volume than the second projection surface;

decode a first geometry picture from said bitstream to obtain first and second decoded geometry data of said first source volume, said first decoded geometry data comprising mapping of said first projection surface to said first source volume and a first depth, from the first projection surface to the first source volume, for a first point of the first projection, said second decoded geometry data comprising mapping of said second projection surface to said first source volume and a second depth, from the second projection surface to the first source volume, for a second point of the second projection;

decode projection geometry information of said first and second projections from said bitstream, said projection geometry information comprising information of position of said first and second projection surfaces in said scene model; and form a reconstructed scene model by projecting said first decoded texture data to a first destination volume using said first decoded geometry data and said projection geometry information, and by projecting said second decoded texture data to said first destination volume using said second decoded geometry data and said projection geometry information.

* * * * *